United States Patent
Lam et al.

(10) Patent No.: US 10,019,178 B2
(45) Date of Patent: Jul. 10, 2018

(54) METHOD AND RELATED DEVICE FOR DETERMINING MANAGEMENT MODE OF SHARED VIRTUAL MEMORY PAGE

(71) Applicant: HUAWEI TECHNOLOGIES CO., LTD., Shenzhen, Guangdong (CN)

(72) Inventors: KingTin Lam, Hong Kong (HK); Wangbin Zhu, Shenzhen (CN); Youliang Yan, Shenzhen (CN); Cho-Li Wang, Hong Kong (HK); Jinghao Shi, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 14/749,869

(22) Filed: Jun. 25, 2015

(65) Prior Publication Data

US 2015/0293720 A1 Oct. 15, 2015

Related U.S. Application Data

(63) Continuation of application No. PCT/CN2013/080863, filed on Aug. 6, 2013.

(30) Foreign Application Priority Data

Dec. 25, 2012 (CN) .......................... 2012 1 0572056

(51) Int. Cl.
*G06F 12/00* (2006.01)
*G06F 13/00* (2006.01)
(Continued)

(52) U.S. Cl.
CPC ............ *G06F 3/0619* (2013.01); *G06F 3/065* (2013.01); *G06F 3/067* (2013.01); *G06F 3/0653* (2013.01);
(Continued)

(58) Field of Classification Search
CPC .......... G06F 2212/621; G06F 12/0828; G06F 12/0804; G06F 12/0815; G06F 12/0835; G06F 12/0837
(Continued)

(56) References Cited

U.S. PATENT DOCUMENTS

| 5,630,097 A | 5/1997 | Orbits et al. |
| 5,875,487 A | 2/1999 | Schwartz |

(Continued)

FOREIGN PATENT DOCUMENTS

| CN | 1149736 A | 5/1997 |
| CN | 101398768 A | 4/2009 |

(Continued)

OTHER PUBLICATIONS

Osamu Tatebe, et al., "OpenMP compiler for PC clusters using TDL distributed array library", Inforamtion Processing Society of Japan Techncial Reports, Information Processing Society of Japan, Jul. 27, 2001, vol. 2001, No. 77 (2001-HPC-87), pp. 123-128, with English abctract.

(Continued)

*Primary Examiner* — Sean D Rossiter
(74) *Attorney, Agent, or Firm* — Huawei Technologies Co., Ltd.

(57) ABSTRACT

A method and a related device for determining a management mode of a shared virtual memory page are disclosed. In one example, a method is disclosed that includes monitoring frequency or mode of access operation of at least one process accessing the shared virtual memory page; and changing the management mode of the shared virtual memory page to a shared physical memory mode if the monitored frequency or mode of access operation meets a first set condition and a current management mode of the shared virtual memory page is a distributed shared memory (Continued)

---

101 — Monitor access characteristics of access performed by a process for a shared virtual memory page 102 — Change a management mode of a first shared virtual memory page to an SPM mode if the monitored access characteristics meet a first set condition and the current management mode of the first shared virtual memory page is a DSM mode,
and/or,
change the management mode of the first shared virtual memory page to a DSM mode if the monitored access characteristics meet a second set condition and the current management mode of the first shared virtual memory page is an SPM mode mode. The technical solutions provided in the present disclosure can enhance performance of accessing a shared virtual memory.

12 Claims, 7 Drawing Sheets

(51) Int. Cl.
  *G06F 3/06* (2006.01)
  *G06F 9/50* (2006.01)
  *G06F 12/109* (2016.01)
  *G06F 12/1072* (2016.01)

(52) U.S. Cl.
  CPC .......... *G06F 9/5016* (2013.01); *G06F 12/109* (2013.01); *G06F 12/1072* (2013.01); *G06F 2212/1024* (2013.01); *G06F 2212/656* (2013.01)

(58) Field of Classification Search
  USPC .......................................................... 711/141
  See application file for complete search history.

(56) References Cited

U.S. PATENT DOCUMENTS

| | | | |
|---|---|---|---|
| 6,075,938 | A | 6/2000 | Bugnion |
| 6,910,106 | B2 | 6/2005 | Sechrest |
| 8,135,936 | B2 | 3/2012 | Schaefer et al. |
| 8,156,305 | B1 | 4/2012 | Goodson et al. |
| 8,195,914 | B2 | 6/2012 | Hall et al. |
| 9,208,088 | B2 * | 12/2015 | Lee ..................... G06F 12/0815 |
| 9,824,011 | B2 * | 11/2017 | Lam ..................... G06F 12/0817 |
| 2002/0013889 | A1 | 1/2002 | Schuster et al. |
| 2003/0061395 | A1 * | 3/2003 | Kingsbury .............. G06F 9/544 |
| | | | 719/312 |
| 2004/0073743 | A1 | 4/2004 | Arimilli et al. |
| 2007/0011420 | A1 | 1/2007 | Boss et al. |
| 2007/0180448 | A1 | 8/2007 | Low |
| 2016/0034397 | A1 * | 2/2016 | Lam ..................... G06F 12/0842 |
| | | | 711/119 |

FOREIGN PATENT DOCUMENTS

| | | |
|---|---|---|
| CN | 101477496 A | 7/2009 |
| EP | 0780770 A1 | 6/1997 |
| EP | 0848330 A2 | 6/1998 |
| JP | 109185550 A | 7/1997 |
| JP | H10320272 A | 12/1998 |
| JP | 2001175619 A | 6/2001 |
| JP | 2009500705 A | 1/2009 |
| JP | 201165650 A | 3/2011 |
| KR | 20040032745 A | 4/2004 |
| RU | 2348067 C2 | 2/2009 |
| WO | 2007003630 A1 | 1/2007 |

OTHER PUBLICATIONS

Yukio Oishi, et al., "Two-level Scheduling in Collaboration with Memory Management for NUMA Multiprocessors", Inforamtion Processing Society of Japan Techncial Reports, Information Processing Society of Japan, Aug. 23, 1995, vol. 95, No. 79 (95-OS-70), pp. 97-104. with English abctract.
Xiaocheng Zhou et al: "A Case for Software Managed Coherence in Many-core Processors", Intel Corporation, 2010, total 6 pages.
Junghyun Kim et al: "An Efficient Software Shared Virtual Memory for the Single-chip Cloud Computer", 2011, total 5 pages.
Stefan Lankes et al: "The Path to Metal SVM: Shared Virtual Memory for the SCC", Dec. 2011, total 8 pages.

\* cited by examiner

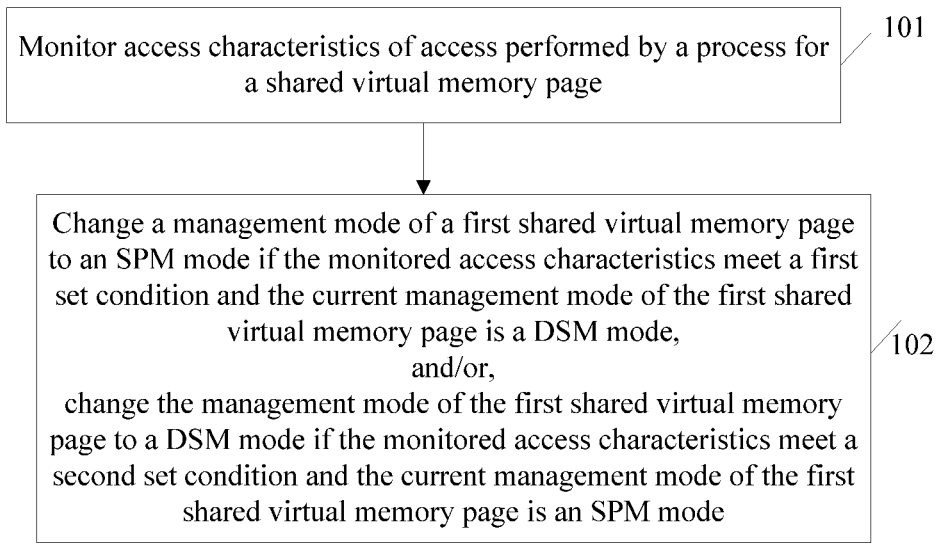
FIG. 1
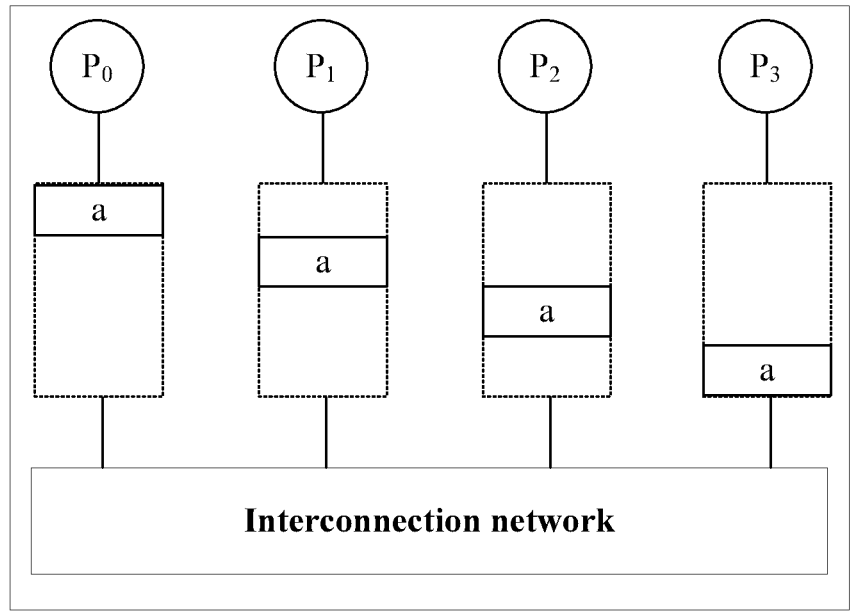
FIG. 2-a

FIG. 2-b

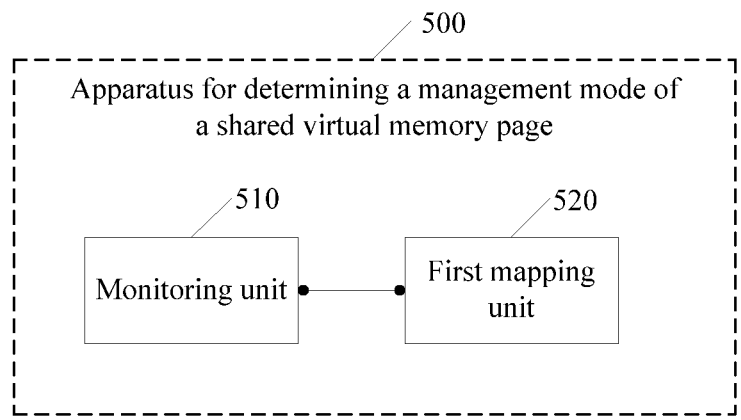
FIG. 5-a
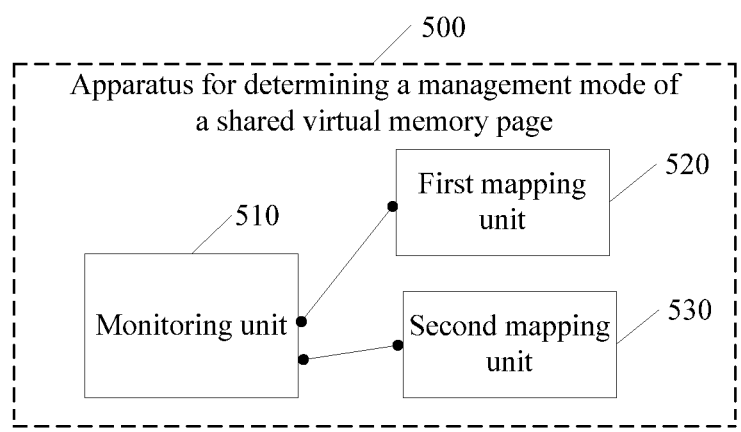
FIG. 5-b

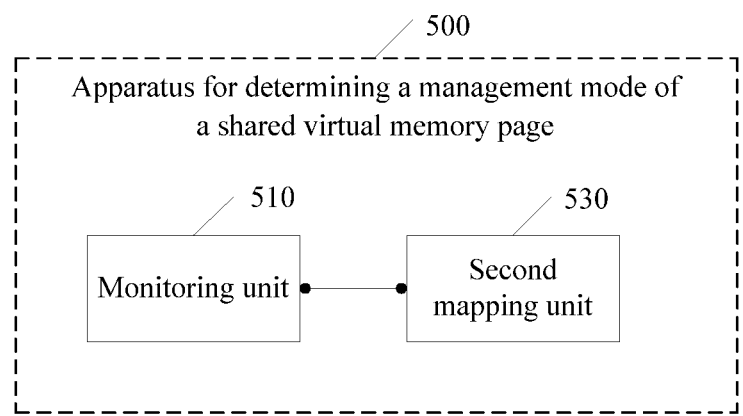
FIG. 5-c
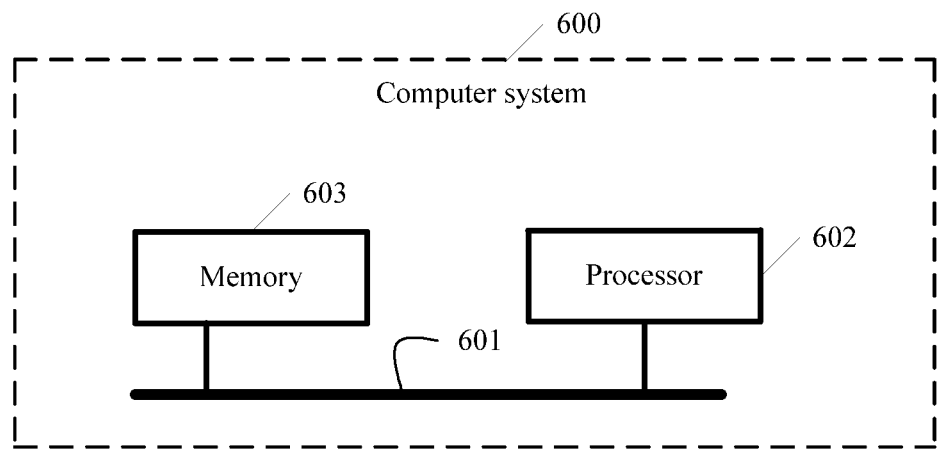
FIG. 6

METHOD AND RELATED DEVICE FOR DETERMINING MANAGEMENT MODE OF SHARED VIRTUAL MEMORY PAGE

CROSS-REFERENCE TO RELATED APPLICATIONS

This application is a continuation of International Application No. PCT/CN2013/080863, filed on Aug. 6, 2013, which claims priority to Chinese Patent Application No. 201210572056.5, filed on Dec. 25, 2012, both of which are hereby incorporated by reference in their entireties.

TECHNICAL FIELD

The present disclosure relates to the field of computer technologies, and in particular to a method and a related device for determining a management mode of a shared virtual memory page.

BACKGROUND

The Moore's Law put forward by one of the founders of Intel, Gordon Moore, has been guiding development of the semiconductor industry and the advancement speed of the information technology in the recent half century. As disclosed by Intel, the Moore's Law will still work in the coming 10 years. It is predicted that more than $1.024 \times 10^{12}$ transistors will be integrated on a single chip in 2022.

However, the time has gone when the computing performance is enhanced by the clock speed alone, and performance enhancement of a central processing unit (CPU) is now bottlenecked by physical laws such as power consumption, interconnection delay, and design complexity. Due to the physical law bottlenecking, the change from single-core to multi-core (traditionally referring to less than 8 cores) or even many-core is inevitable, and is a result of interaction between the Moore's Law and the three physical laws. Many-core will be a main trend of future CPU architecture.

A multi-core/many-core processor scenario needs to allow for cache coherence, which may be solved by a software cache coherence mechanism or a hardware cache coherence mechanism. The software cache coherence mechanism primarily relates to two possible modes: a distributed shared memory (DSM) mode and a shared physical memory (SPM) mode. The DSM mode/SPM mode may be applied in a con-cache-coherent (NCC) many-core system to solve the cache coherence issue. In a single-chip cloud computer (SCC) developed by Intel, a Software Managed Cache Coherence (SMC) protocol adopts the SPM mode.

SUMMARY

Embodiments of the present disclosure provide a method and a related device for determining a management mode of a shared virtual memory page, with a view to enhancing performance of accessing a shared virtual memory.

In a first aspect, the present disclosure provides a method for determining a management mode of a shared virtual memory page, that include monitoring access characteristics of access performed by a process for the shared virtual memory page and changing the management mode of the shared virtual memory page to a shared physical memory mode if the monitored access characteristics meet a first set condition and a current management mode of the shared virtual memory page is a distributed shared memory mode.

With reference to the first aspect, in a first possible implementation manner, the method further may include changing the management mode of the shared virtual memory page to a distributed shared memory mode if the monitored access characteristics meet a second set condition and the current management mode of the shared virtual memory page is a shared physical memory mode.

With reference to the first aspect or the first possible implementation manner of the first aspect, in a second possible implementation manner, the changing the management mode of the shared virtual memory page to a distributed shared memory mode includes in a first physical memory space, allocating a first physical memory page to the shared virtual memory page, copying data stored on a second physical memory page to the first physical memory page, where the second physical memory page belongs to a shared physical memory space, and the second physical memory page is a physical memory page currently mapped from the shared virtual memory page, creating a mapping relationship between the shared virtual memory page and the first physical memory page; and recording the distributed shared memory mode as the management mode of the shared virtual memory page.

With reference to the first aspect, the first possible implementation manner of the first aspect, or the second possible implementation manner of the first aspect, in a third possible implementation manner, the first set condition includes that an access frequency is less than or equal to a first threshold, an access mode is read-write access or write access, a frequency of write access is greater than a third threshold, or a percentage of write access is greater than a fourth threshold.

With reference to the first aspect, the first possible implementation manner of the first aspect, the second possible implementation manner of the first aspect, or the third possible implementation manner of the first aspect, in a fourth possible implementation manner, the second set condition includes that the access frequency is greater than a second threshold, the access mode is read-only access, a frequency of read access is greater than a fifth threshold, or a percentage of read access is greater than a sixth threshold, where the second threshold is greater than or equal to the first threshold.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the changing the management mode of the shared virtual memory page to a shared physical memory mode includes creating a mapping relationship between the shared virtual memory page and a third physical memory page, where the third physical memory page belongs to the shared physical memory space; and recording the shared physical memory mode as the management mode of the shared virtual memory page, where data stored on the physical memory page previously mapped from the shared virtual memory page remains unchanged.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner, the changing the management mode of the shared virtual memory page to a shared physical memory mode includes synchronizing changed data in data stored on a fourth physical memory page to a third physical memory page; creating a mapping relationship between the shared virtual memory page and the third physical memory page, where the third physical memory page belongs to the shared physical memory space; and recording the shared physical memory mode as the management mode of the shared virtual memory page, where the fourth physical memory page is a physical memory page previously mapped from the shared virtual memory page.

With reference to the first aspect or the first possible implementation manner of the first aspect, in a seventh possible implementation manner, on condition that the process includes multiple processes, the changing the management mode of the shared virtual memory page to a shared physical memory mode if the monitored access characteristics meet a first set condition and the current management mode of the shared virtual memory page is a distributed shared memory mode includes using an average, a weighted average, a sum, or a weighted sum of access characteristics, which are respectively monitored for each of the multiple processes that access the shared virtual memory page, as the monitored access characteristics of the multiple processes that access the shared virtual memory page; or, using monitored access characteristics of one of the multiple processes that access the shared virtual memory page as the monitored access characteristics of the multiple processes that access the shared virtual memory page; and changing the management mode corresponding to the multiple processes on the shared virtual memory page to a shared physical memory mode if the monitored access characteristics of access performed by the multiple processes for the shared virtual memory page meet the first condition and if the current management mode corresponding to the multiple processes on the shared virtual memory page is a distributed shared memory mode.

With reference to the first possible implementation manner of the first aspect, in an eighth possible implementation manner on condition that the process includes multiple processes, the changing the management mode of the shared virtual memory page to a distributed shared memory mode if the monitored access characteristics meet a second set condition and the current management mode of the shared virtual memory page is a shared physical memory mode includes using an average, a weighted average, a sum, or a weighted sum of access characteristics, which are respectively monitored for each of the multiple processes that access the shared virtual memory page, as the monitored access characteristics of the multiple processes that access the shared virtual memory page; or, using monitored access characteristics of one of the multiple processes that access the shared virtual memory page as the monitored access characteristics of the multiple processes that access the shared virtual memory page; and changing the management mode corresponding to the multiple processes on the shared virtual memory page to a distributed shared memory mode if the monitored access characteristics of access performed by the multiple processes for the shared virtual memory page meet the second condition and if the current management mode corresponding to the multiple processes on the shared virtual memory page is a shared physical memory mode.

In a second aspect, the present disclosure provides a method for determining a management mode of a shared virtual memory page, including monitoring access characteristics of access performed by a process for the shared virtual memory page and changing the management mode of the shared virtual memory page to a distributed shared memory mode if the monitored access characteristics meet a second set condition and the current management mode of the shared virtual memory page is a shared physical memory mode.

With reference to the second aspect, in a first possible implementation manner, the changing the management mode of the shared virtual memory page to a distributed shared memory mode includes in a first physical memory space, allocating a first physical memory page to the shared virtual memory page copying data stored on a second physical memory page to the first physical memory page, where the second physical memory page belongs to a shared physical memory space, and the second physical memory page is a physical memory page currently mapped from the shared virtual memory page, creating a mapping relationship between the shared virtual memory page and the first physical memory page, and recording the distributed shared memory mode as the management mode of the shared virtual memory page.

With reference to the second aspect, in a second possible implementation manner, on condition that the process includes multiple processes, the changing the management mode of the shared virtual memory page to a distributed shared memory mode if the monitored access characteristics meet a second set condition and the current management mode of the shared virtual memory page is a shared physical memory mode includes using an average, a weighted average, a sum, or a weighted sum of access characteristics, which are respectively monitored for each of the multiple processes that access the shared virtual memory page, as the monitored access characteristics of the multiple processes that access the shared virtual memory page; or, using monitored access characteristics of one of the multiple processes that access the shared virtual memory page as the monitored access characteristics of the multiple processes that access the shared virtual memory page; and changing the management mode corresponding to the multiple processes on the shared virtual memory page to a distributed shared memory mode if the monitored access characteristics of access performed by the multiple processes for the shared virtual memory page meet the second condition and if the current management mode corresponding to the multiple processes on the shared virtual memory page is a shared physical memory mode.

With reference to the second aspect, the first possible implementation manner of the second aspect, or the second possible implementation manner of the second aspect, in a third possible implementation manner, the second set condition includes an access frequency is greater than a second threshold, an access mode is read-only access, a frequency of read access is greater than a fifth threshold, or a percentage of read access is greater than a sixth threshold.

In a third aspect, the present disclosure provides an apparatus for determining a management mode of a shared virtual memory page, a monitoring unit, configured to monitor access characteristics of access performed by a process for the shared virtual memory page and a first remapping unit connected to the monitoring unit, configured to change the management mode of the shared virtual memory page to a shared physical memory mode if the access characteristics monitored by the monitoring unit meet a first set condition and a current management mode of the shared virtual memory page is a distributed shared memory mode.

With reference to the third aspect, in a first possible implementation manner, the apparatus further includes a second remapping unit connected to the monitoring unit, configured to change the management mode of the shared virtual memory page to a distributed shared memory mode if the access characteristics monitored by the monitoring unit meet a second set condition and a current management mode of the shared virtual memory page is a shared physical memory mode.

With reference to the first possible implementation manner of the third aspect, in a second possible implementation manner, the second remapping unit is specifically configured to: if the access characteristics monitored by the monitoring unit meet a second set condition and the current management mode of the shared virtual memory page is a shared physical memory mode, then in a first physical memory space, allocate a first physical memory page to the shared virtual memory page; copy data stored on a second physical memory page to the first physical memory page, where the second physical memory page belongs to a shared physical memory space, and the second physical memory page is a physical memory page currently mapped from the shared virtual memory page; create a mapping relationship between the shared virtual memory page and the first physical memory page; and record the distributed shared memory mode as the management mode of the shared virtual memory page.

With reference to the third aspect, the first possible implementation manner of the third aspect, or the second possible implementation manner of the third aspect, in a third possible implementation manner the first set condition includes that an access frequency is less than or equal to a first threshold, an access mode is read-write access or write access, a frequency of write access is greater than a third threshold, or a percentage of write access is greater than a fourth threshold the monitoring unit is specifically configured to monitor an access frequency of access performed by the process for the shared virtual memory page, where the first remapping unit is specifically configured to change the management mode of the shared virtual memory page to a shared physical memory mode if the access frequency of access performed by the process for the shared virtual memory page, which is monitored by the monitoring unit, is less than or equal to the first threshold, and if the current management mode of the shared virtual memory page is a distributed shared memory mode or, the monitoring unit is specifically configured to monitor an access mode of access performed by the process for the shared virtual memory page the first remapping unit is specifically configured to change the management mode of the shared virtual memory page to a shared physical memory mode if the access mode of access performed by the process for the shared virtual memory page, which is monitored by the monitoring unit, is read-write access or write access, and if the current management mode of the shared virtual memory page is a distributed shared memory mode;

It is also contemplated that the monitoring unit is specifically configured to monitor the frequency of write access performed by the process for the shared virtual memory page, where the first remapping unit is specifically configured to change the management mode of the shared virtual memory page to a shared physical memory mode if the frequency of write access performed by the process for the shared virtual memory page, which is monitored by the monitoring unit, is greater than the third threshold, and if the current management mode of the shared virtual memory page is a distributed shared memory mode or the monitoring unit is specifically configured to monitor a percentage of write access performed by the process for the shared virtual memory page, where the first remapping unit is specifically configured to change the management mode of the shared virtual memory page to a shared physical memory mode if the percentage of write access performed by the process for the shared virtual memory page, which is monitored by the monitoring unit, is greater than the fourth threshold, and if the current management mode of the shared virtual memory page is a distributed shared memory mode.

With reference to the third possible implementation manner of the third aspect, in a fourth possible implementation manner, the second set condition includes that the access frequency is greater than a second threshold, the access mode is read-only access, a frequency of read access is greater than a fifth threshold, or a percentage of read access is greater than a sixth threshold, where the second threshold is greater than or equal to the first threshold, where the monitoring unit is specifically configured to monitor an access frequency of access performed by the process for the shared virtual memory page, where the second remapping unit is specifically configured to change the management mode of the shared virtual memory page to a distributed shared memory mode if the access frequency monitored by the monitoring unit is greater than the second threshold and the current management mode of the shared virtual memory page is a shared physical memory mode or the monitoring unit is specifically configured to monitor an access mode of access performed by the process for the shared virtual memory page the second remapping unit is specifically configured to change the management mode of the shared virtual memory page to a distributed shared memory mode if the access mode monitored by the monitoring unit is read-only access and the current management mode of the shared virtual memory page is a shared physical memory mode or the monitoring unit is specifically configured to monitor a read access frequency of access performed by the process for the shared virtual memory page, where the second remapping unit is specifically configured to change the management mode of the shared virtual memory page to a distributed shared memory mode if the read access frequency monitored by the monitoring unit is greater than the fifth threshold and the current management mode of the shared virtual memory page is a shared physical memory mode; or, the monitoring unit is specifically configured to monitor a percentage of read access performed by the process for the shared virtual memory page, where the second remapping unit is specifically configured to change the management mode of the shared virtual memory page to a distributed shared memory mode if the percentage of read access monitored by the monitoring unit is greater than the sixth threshold and the current management mode of the shared virtual memory page is a shared physical memory mode.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the first remapping unit is specifically configured to: if the access characteristics monitored by the monitoring unit meet a first set condition and the current management mode of the shared virtual memory page is a distributed shared memory mode, create a mapping relationship between the shared virtual memory page and a third physical memory page, where the third physical memory page belongs to the shared physical memory space; and record the shared physical memory mode as the management mode of the shared virtual memory page, where data stored on the physical memory page previously mapped from the shared virtual memory page remains unchanged.

With reference to the third aspect, the first possible implementation of the third aspect, the second possible implementation manner of the third aspect, the third possible implementation manner of the third aspect, or the fourth possible implementation manner of the third aspect, in a sixth possible implementation manner, the first remapping unit is specifically configured to: synchronize changed data in data stored on a fourth physical memory page to a third physical memory page if the access characteristics monitored by the monitoring unit meet a first set condition and the current management mode of the shared virtual memory page is a distributed shared memory mode; create a mapping relationship between the shared virtual memory page and the third physical memory page, where the third physical memory page belongs to the shared physical memory space; and record the shared physical memory mode as the management mode of the shared virtual memory page, where the fourth physical memory page is a physical memory page previously mapped from the shared virtual memory page.

With reference to the third aspect or the first possible implementation manner of the third aspect, in a seventh possible implementation manner, if the process includes multiple processes, the first remapping unit is specifically configured to: use an average, a weighted average, a sum, or a weighted sum of access characteristics, which are respectively monitored by the monitoring unit for each of the multiple processes that access the shared virtual memory page, as the monitored access characteristics of the multiple processes that access the shared virtual memory page; or, use the access characteristics, which are monitored by the monitoring unit for one of the multiple processes that access the shared virtual memory page, as the monitored access characteristics of the multiple processes that access the shared virtual memory page; and change the management mode corresponding to the multiple processes on the shared virtual memory page to a shared physical memory mode if the monitored access characteristics of access performed by the processes for the shared virtual memory page meet the first condition and if the current management mode corresponding to the multiple processes on the shared virtual memory page is a distributed shared memory mode.

With reference to the first possible implementation manner of the third aspect, in an eighth possible implementation manner, if the process includes multiple processes, the second remapping unit is specifically configured to: use an average, a weighted average, a sum, or a weighted sum of access characteristics, which are respectively monitored by the monitoring unit for each of the multiple processes that access the shared virtual memory page, as the monitored access characteristics of the multiple processes that access the shared virtual memory page; or, use the access characteristics, which are monitored by the monitoring unit for one of the multiple processes that access the shared virtual memory page, as the monitored access characteristics of the multiple processes that access the shared virtual memory page; and change the management mode corresponding to the multiple processes on the shared virtual memory page to a distributed shared memory mode if the monitored access characteristics of access performed by the multiple processes for the shared virtual memory page meet the second condition and if the current management mode corresponding to the multiple processes on the shared virtual memory page is a shared physical memory mode.

In a fourth aspect, the present disclosure provides an apparatus for determining a management mode of a shared virtual memory page, which may include: a monitoring unit, configured to monitor access characteristics of access performed by a process for the shared virtual memory page; and a second remapping unit connected to the monitoring unit, configured to change the management mode of the shared virtual memory page to a distributed shared memory mode if the access characteristics monitored by the monitoring unit meet a second set condition and a current management mode of the shared virtual memory page is a shared physical memory mode.

With reference to the fourth aspect, in a first possible implementation manner, the second remapping unit is specifically configured to: if the access characteristics monitored by the monitoring unit meet a second set condition and the current management mode of the shared virtual memory page is a shared physical memory mode, then in a first physical memory space, allocate a first physical memory page to the shared virtual memory page; copy data stored on a second physical memory page to the first physical memory page, where the second physical memory page belongs to a shared physical memory space, and the second physical memory page is a physical memory page currently mapped from the shared virtual memory page; create a mapping relationship between the shared virtual memory page and the first physical memory page; and record the distributed shared memory mode as the management mode of the shared virtual memory page.

With reference to the fourth aspect or the first possible implementation manner of the fourth aspect, in a second possible implementation manner, the second set condition includes that an access frequency is greater than a second threshold, an access mode is read-only access, a frequency of read access is greater than a fifth threshold, or a percentage of read access is greater than a sixth threshold where, the monitoring unit is specifically configured to monitor an access frequency of access performed by the process for the shared virtual memory page, where the second remapping unit is specifically configured to change the management mode of the shared virtual memory page to a distributed shared memory mode if the access frequency monitored by the monitoring unit is greater than the second threshold and the current management mode of the shared virtual memory page is a shared physical memory mode; or, the monitoring unit is specifically configured to monitor an access mode of access performed by the process for the shared virtual memory page, the second remapping unit is specifically configured to change the management mode of the shared virtual memory page to a distributed shared memory mode if the access mode monitored by the monitoring unit is read-only access and the current management mode of the shared virtual memory page is a shared physical memory mode, or the monitoring unit is specifically configured to monitor a read access frequency of access performed by the process for the shared virtual memory page, where the second remapping unit is specifically configured to change the management mode of the shared virtual memory page to a distributed shared memory mode if the read access frequency monitored by the monitoring unit is greater than the fifth threshold and the current management mode of the shared virtual memory page is a shared physical memory mode. It is also contemplated that the monitoring unit may be specifically configured to monitor a percentage of read access performed by the process for the shared virtual memory page, where the second remapping unit is specifically configured to change the management mode of the shared virtual memory page to a distributed shared memory mode if the percentage of read access monitored by the monitoring unit is greater than the sixth threshold and the current management mode of the shared virtual memory page is a shared physical memory mode.

With reference to the fourth aspect, the first possible implementation manner of the fourth aspect, or the second possible implementation manner of the fourth aspect, in a third possible implementation manner, if the process includes multiple processes, the second remapping unit is specifically configured to: use an average, a weighted average, a sum, or a weighted sum of access characteristics, which are respectively monitored by the monitoring unit for each of the multiple processes that access the shared virtual memory page, as the monitored access characteristics of the multiple processes that access the shared virtual memory page; or, use the access characteristics, which are monitored by the monitoring unit for one of the multiple processes that access the shared virtual memory page, as the monitored access characteristics of the multiple processes that access the shared virtual memory page; and change the management mode corresponding to the multiple processes on the shared virtual memory page to a distributed shared memory mode if the monitored access characteristics of access performed by the multiple processes for the shared virtual memory page meet the second condition and if the current management mode corresponding to the multiple processes on the shared virtual memory page is a shared physical memory mode.

In a fifth aspect, the present disclosure provides a computer system, including: a bus, a processor connected to the bus, and a memory connected to the bus, where the processor uses the bus to call codes in the memory to monitor access characteristics of access performed by a process for the shared virtual memory page; and change the management mode of the shared virtual memory page to a shared physical memory mode if the monitored access characteristics meet a first set condition and a current management mode of the shared virtual memory page is a distributed shared memory mode.

In a sixth aspect, the present disclosure provides a computer system, includes a bus, a processor connected to the bus, and a memory connected to the bus, where the processor uses the bus to call codes in the memory to monitor access characteristics of access performed by a process for the shared virtual memory page; and change the management mode of the shared virtual memory page to a distributed shared memory mode if the monitored access characteristics meet a second set condition and a current management mode of the shared virtual memory page is a shared physical memory mode.

As can be seen, in the embodiments of the present disclosure, the access characteristics of the shared virtual memory page are monitored; and the management mode of the shared virtual memory page is changed to a shared physical memory mode if the monitored access characteristics meet the first set condition and the current management mode of the shared virtual memory page is a distributed shared memory mode; or, the management mode of the shared virtual memory page is changed to a distributed shared memory mode if the monitored access characteristics meet the second set condition and the current management mode of the shared virtual memory page is a shared physical memory mode. The mechanism of resetting the management mode of the shared virtual memory page according to a monitoring result of the access characteristics achieves better matching between the management mode and the access characteristics, brings the advantages of the DSM mode or the SPM mode into better play, and lays a mechanism foundation for enhancing performance of accessing the shared virtual memory.

BRIEF DESCRIPTION OF DRAWINGS

To illustrate the technical solutions in the embodiments of the present disclosure more clearly, the following briefly introduces the accompanying drawings required for describing the embodiments.

FIG. 1 is a schematic flowchart of a method for determining a management mode of a shared virtual memory page according to an embodiment of the present disclosure;

FIG. 2-b is a schematic diagram of a private physical memory space in DSM mode according to an embodiment of the present disclosure;

FIG. 5-a is a schematic diagram of an apparatus for determining a management mode of a shared virtual memory page according to an embodiment of the present disclosure;

FIG. 5-b is a schematic diagram of an apparatus for determining a management mode of a shared virtual memory page according to an embodiment of the present disclosure;

FIG. 5-c is a schematic diagram of an apparatus for determining a management mode of a shared virtual memory page according to an embodiment of the present disclosure;

FIG. 6 is a schematic structural diagram of a computer system according to the present disclosure.

DESCRIPTION OF EMBODIMENTS

Figure 2:
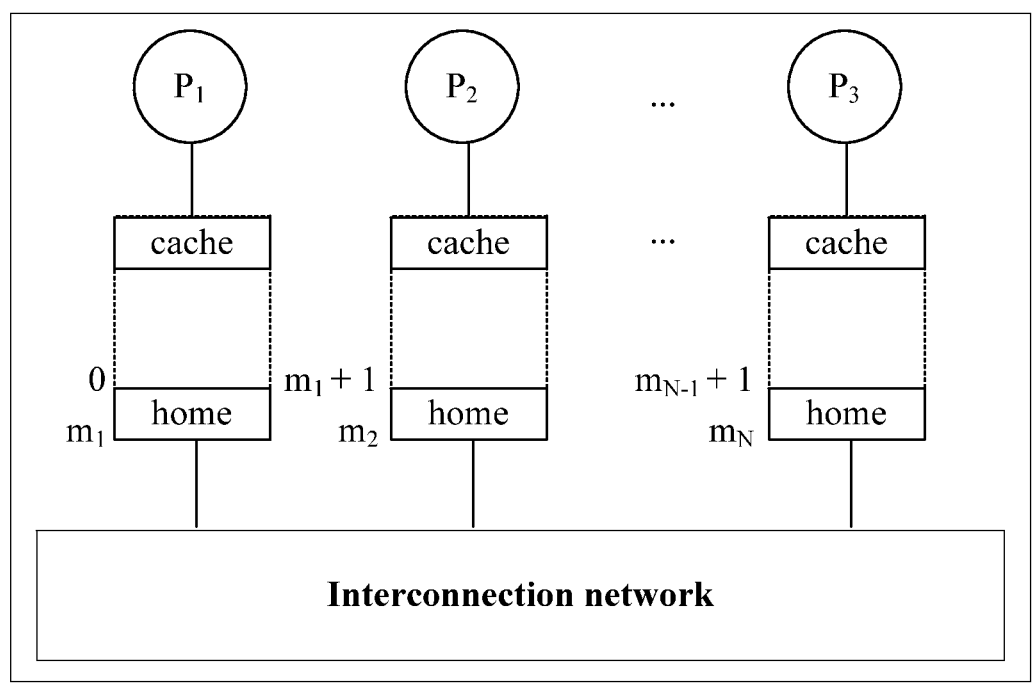
FIG. 2-a is a schematic diagram of a shared virtual address space in DSM mode according to an embodiment of the present disclosure.

Embodiments of the present disclosure provide a method and a related device for determining a management mode of a shared virtual memory page, with a view to enhancing performance of accessing a shared virtual memory.

To make the solutions of the present disclosure more comprehensible for a person skilled in the art, the following clearly describes the technical solutions in the embodiments of the present disclosure with reference to the accompanying drawings in the embodiments of the present disclosure.

In the Description, Claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present disclosure described herein can be implemented in other orders than the order illustrated or described herein. In addition, the terms "include", "comprise", and any variation thereof are intended to cover non-exclusive inclusion. For example, a process, method, system, product, or device that includes a series of steps or units is not limited to the steps or units enumerated expressly, but may include other steps or units that are not enumerated expressly or are inherent in the process, method, product, or device.

In an embodiment of the present disclosure, a method for determining a management mode of a shared virtual memory page may include: monitoring access characteristics of access performed by a process for the shared virtual memory page; and changing the management mode of the shared virtual memory page to an SPM mode if the monitored access characteristics meet a first set condition and a current management mode of the shared virtual memory page is a DSM mode, and/or, changing the management mode of the shared virtual memory page to a DSM mode if the monitored access characteristics meet a second set condition and the current management mode of the shared virtual memory page is an SPM mode.

FIG. 1 is a schematic flowchart of a method for determining a management mode of a shared virtual memory page according to an embodiment of the present disclosure. As shown in FIG. 1, a method for determining a management mode of a shared virtual memory page according to an embodiment of the present disclosure may include the following content.

Block 101 discloses the monitoring of access characteristics of access performed by a process for the shared virtual memory page. In some embodiments of the present disclosure, the access characteristics of access performed by N processes for the shared virtual memory page (for convenience of citation, called a first shared virtual memory page below) can be monitored, where N is a positive integer. For example, if N is equal to 1, the N process may refer to any process currently existent in the system or a specific process; if N is greater than 1, the N processes may refer to part or all of the processes currently existent in the system. For example, the N processes may refer to part or all of the processes, which currently exist in the system and will possibly access the first shared virtual memory page. In some embodiments of the present disclosure, for example, a performance counter or other hardware or programs of the CPU may be used to monitor the access characteristics of the shared virtual memory page.

In some embodiments of the present disclosure, for example, various access characteristics of access performed by the process for the shared virtual memory page may be monitored. The access characteristics may include access frequency and/or access mode, and so on. The access modes may include read-only access, read-write access (the read-write access refers to access that involves both read and write), write access, and so on. That is, the access characteristics such as access frequency and/or access mode of access performed by the process for the shared virtual memory page can be monitored.

In some embodiments of the present disclosure, the access frequency of access performed by the process for the first shared virtual memory page may refer to the times the process accesses the first shared virtual memory page in a unit time. For example, the access frequency of access performed by a process for the first shared virtual memory page may refer to the times the process accesses the first shared virtual memory page in a unit time. Similarly, the access frequency of access performed by multiple processes for the first shared virtual memory page may refer to the times the multiple processes access the first shared virtual memory page in a unit time.

In other embodiments of the present disclosure, the access frequency of access performed by the process for the first shared virtual memory page may refer to a percentage of the number of times of access performed by the process for the first shared virtual memory page to the total number of times of access performed by the process for N1 shared virtual memory pages in a duration (such as a unit time), where the N1 shared virtual memory pages include the first shared virtual memory page and N1 is a positive integer greater than 1. For example, the access frequency of access performed by a process for the first shared virtual memory page may refer to a percentage of the number of times of access performed by the process for the first shared virtual memory page to the total number of times of access performed by the process for N1 shared virtual memory pages in a duration; and the access frequency of access performed by multiple processes for the first shared virtual memory page may refer to a percentage of the number of times of access performed by the multiple processes for the first shared virtual memory page to the total number of times of access performed by the multiple processes for the N1 shared virtual memory pages in a duration.

Of course, the way of calculating the access frequency is not limited to the above example, and other ways of calculation compliant with the laws of the nature may be defined as required.

Block 102 discloses changing the management mode of the first shared virtual memory page to an SPM mode if the monitored access characteristics meet the first set condition and the current management mode of the first shared virtual memory page is a DSM mode, and/or, change the management mode of the first shared virtual memory page to a DSM mode if the monitored access characteristics meet the second set condition and the current management mode of the first shared virtual memory page is an SPM mode.

It can be understood that the first set condition and the second set condition may vary with the monitored access characteristics. For example, if the monitored access characteristics are an access frequency, the first set condition and the second set condition may include set conditions related to the access frequency; if the monitored access characteristics are an access mode, the first set condition and the second set condition may include set conditions related to the access mode; and, if the monitored access characteristics include the access frequency and the access mode, the first set condition and the second set condition may include set conditions related to the both access frequency and the access mode.

In some embodiments of the present disclosure, if the monitored access characteristics include an access frequency of access performed by the process for the first shared virtual memory page, the first set condition may include that the access frequency is less than or equal to a first threshold (the first threshold may be 1000 times per second, 2000 times per second, 5000 times per second, or another frequency value); and the second set condition may include that the access frequency is greater than a second threshold, where the first threshold may be less than or equal to the second threshold, and the second threshold may be 1000 times per second, 2000 times per second, 3000 times per second, 5000 times per second, or another frequency value, where the second threshold is greater than or equal to the first threshold. In this scenario, the management mode of the first shared virtual memory page may be changed to an SPM mode if the monitored access frequency is less than or equal to the first threshold and the current management mode of the first shared virtual memory page is a DSM mode, and/or, the management mode of the first shared virtual memory page may be changed to a DSM mode if the monitored access frequency is greater than the second threshold and the current management mode of the first shared virtual memory page is an SPM mode.

It can be understood that such a policy may be regarded as a consumptive selection policy according to access data.

In other embodiments of the present disclosure, if the monitored access characteristics include an access mode of access performed by the process for the shared virtual memory page, the first set condition may include that the access mode is write access or read-write access (or the percentage of the write access exceeds a fourth threshold or the frequency of the write access exceeds a third threshold), where the scenario of existence of only write access may be regarded as a fact that the percentage of the number of times of the write access to the total number of times of the read-write access is 100%; and the second set condition may include that the percentage of the read-only access or the read access exceeds a sixth threshold or that the frequency of the read access exceeds a fifth threshold, where the sum of the fourth threshold and the sixth threshold may be greater than or equal to 1. In this scenario, the management mode of the first shared virtual memory page may be changed to an SPM mode if the monitored access mode is write access or read-write access (or the percentage of the write access exceeds a fourth threshold or the frequency of the write access exceeds a third threshold) and the current management mode of the first shared virtual memory page is a DSM mode; and/or, the management mode of the first shared virtual memory page may be changed to a DSM mode if the monitored access mode is read-only access (or the percentage of the read access exceeds the sixth threshold or the frequency of the read access exceeds the fifth threshold) and the current management mode of the first shared virtual memory page is an SPM mode, where the read-only access scenario may be regarded as a fact that the percentage of the number of times of the read access to the total number of times of the read-write access is 100%. The percentage of the write access refers to a percentage of the number of times of the write access to the total number of times of the read-write access, and the percentage of the read access refers to a percentage of the number of times of the read access to the total number of times of the read-write access. Other circumstances can be inferred similarly. It can be understood that such a policy may be regarded as a consumptive selection policy according to access synchronization.

It can be understood that in different multi-core or many-core systems, the management mode of the first shared virtual memory page may be changed to a DSM mode in different ways.

In some embodiments of the present disclosure, the changing the management mode of the first shared virtual memory page to a DSM mode may include: in a first physical memory space, allocating a first physical memory page to the first shared virtual memory page; copying data stored on a second physical memory page to the first physical memory page, where the second physical memory page belongs to a shared physical memory space (the shared physical memory space is a physical memory space that can be shared by several cores), and the second physical memory page is a physical memory page currently mapped from the first shared virtual memory page; creating a mapping relationship between the first shared virtual memory page and the first physical memory page; and recording the DSM mode as the management mode of the first shared virtual memory page.

In some embodiments of the present disclosure, the changing the management mode of the shared virtual memory page to an SPM mode may include: creating a mapping relationship between the first shared virtual memory page and the third physical memory page, where the third physical memory page belongs to the shared physical memory space (the shared physical memory space is a physical memory space that can be shared by several cores); and recording the SPM mode as the management mode of the first shared virtual memory page, where the data stored on the physical memory page previously mapped from the first shared virtual memory page remains unchanged.

In some embodiments of the present disclosure, the changing the management mode of the shared virtual memory page to an SPM mode may include: synchronizing changed data in the data stored on a fourth physical memory page to a third physical memory page; creating a mapping relationship between the first shared virtual memory page and the third physical memory page, where the third physical memory page belongs to the shared physical memory space (the shared physical memory space is a physical memory space that can be shared by several cores); and recording the SPM mode as the management mode of the first shared virtual memory page, where the fourth physical memory page is a physical memory page previously mapped from the first shared virtual memory page.

The changed data in the data stored on the fourth physical memory page (the data may be changed by a process) may refer to a value-varying variable stored on the fourth physical memory page. For example, a variable y1, a variable y2, and a variable y3 stored on the third physical memory page are copied to the fourth physical memory page, after the variable y1, the variable y2, and the variable y3 are stored on the fourth physical memory page, the values of the variable y1 and the variable y2 remain unchanged, but the value of the variable y2 changes from 0 to 1 as against the original copy, and therefore, the changed data in the data stored on the fourth physical memory page include the variable y2, where the variable y2 is the changed data, and other circumstances can be inferred similarly.

The DSM mode/SPM mode may be recorded as the management mode of the first shared virtual memory page in a variety of ways. For example, a management mode flag bit is set for the first shared virtual memory page, and the management mode flag bit may be set to different values to identify whether the management mode of the first shared virtual memory page is a DSM mode or an SPM mode. Alternatively, the management mode of the first shared virtual memory page, which is recorded in the page information structure body of a process (or multiple processes or all processes), may be recorded as a DSM mode or an SPM mode. Other ways of recording are not enumerated here exhaustively.

In some embodiments of the present disclosure, the management mode (such as DSM mode or SPM mode) may be set for each shared virtual memory page (such as the first shared virtual memory page). In this scenario, for all the processes that access the first shared virtual memory page, the management mode of the first shared virtual memory page is the same. Of course, the management mode (such as DSM mode or SPM mode) corresponding to each process may also be set for each shared virtual memory page (such as the first shared virtual memory page). In this scenario, for all the processes that access the first shared virtual memory page, the management mode of the first shared virtual memory page is the same or different. For example, assuming that process A and process B exist, the management mode corresponding to process A on the first shared virtual memory page may be a DSM mode, and the management mode corresponding to process B on the first shared virtual memory page may be an SPM mode.

In some embodiments of the present disclosure, the access characteristics of access performed by the first process for the first shared virtual memory page may be monitored, where the first process may include M1 processes and M1 is a positive integer; and the management mode corresponding to the first process on the first shared virtual memory page may be changed to an SPM mode if the monitored access characteristics meet the first set condition and the current management mode corresponding to the first process on the first shared virtual memory page is a DSM mode; and/or, the management mode corresponding to the first process on the first shared virtual memory page may be changed to a DSM mode if the monitored access characteristics meet the second set condition and the current management mode corresponding to the first process on the first shared virtual memory page is an SPM mode. In this scenario, if the first process includes multiple processes, the management modes corresponding to the multiple processes on the first shared virtual memory page are the same (DSM mode or SPM mode).

Further, the access characteristics of access performed by the second process for the first shared virtual memory page may be monitored, where the second process includes M2 processes, M2 is a positive integer, and the second process is different from the first process; the management mode corresponding to the second process on the first shared virtual memory page may be changed to an SPM mode if the monitored access characteristics of access performed by the second process for the first shared virtual memory page meet the third set condition and the current management mode corresponding to the second process on the first shared virtual memory page is a DSM mode; and/or, the management mode corresponding to the second process on the first shared virtual memory page may be changed to a DSM mode if the monitored access characteristics of access performed by the second process for the first shared virtual memory page meet the fourth set condition and the current management mode corresponding to the second process on the first shared virtual memory page is an SPM mode, where the third set condition is the same as or different from the first condition, and the fourth set condition is the same as or different from the second condition.

In this scenario, the management mode corresponding to the first process on the first shared virtual memory page may be the same as or different from the management mode corresponding to the second process on the first shared virtual memory page, that is, the management modes corresponding to different processes on the same shared virtual memory page may be the same or different, which is called an asynchronous mapping mode. Of course, for the second process, if the management mode of the first shared virtual memory page is determined directly by monitoring the access characteristics of access performed by the first process for the first shared virtual memory page, it is not necessary to implement the step of monitoring the access characteristics of access performed by the second process for the first shared virtual memory page, but the current management mode corresponding to the second process on the first shared virtual memory page may be directly set to the management mode that is the same as the current management mode corresponding to the first process on the first shared virtual memory page. For example, if it is determined that the management mode corresponding to the first process on the first shared virtual memory page is a DSM mode according to a result of monitoring the access characteristics of access performed by the first process for the first shared virtual memory page, the management mode corresponding to the second process on the first shared virtual memory page may also be set to a DSM mode, and other circumstances can be inferred similarly.

In some embodiments of the present disclosure, in a scenario of monitoring the access characteristics of multiple processes (for example, the first process or the second process includes multiple processes) accessing the first shared virtual memory page, the monitored access characteristics of one of the multiple processes (the one process may be any one of the multiple processes or the process that has the maximum parameter value of the access characteristics among the multiple processes) accessing the first shared virtual memory page may be used as the monitored access characteristics of access performed by the multiple processes for the first shared virtual memory page. Alternatively, the monitored integrated access characteristics of access performed by the multiple processes for the first shared virtual memory page may be used as the monitored access characteristics of access performed by the multiple processes for the first shared virtual memory page. For example, an average, a weighted average, a sum, or a weighted sum of the access characteristics, which are monitored respectively for each of the multiple processes that access the first shared virtual memory page (or the integrated access characteristics in other forms), may be used as the monitored access characteristics of access performed by the multiple processes for the first shared virtual memory page. Specifically, for example, an average, a weighted average, a sum, or a weighted sum of the access frequency (or the frequency of read access or the percentage of read access or the frequency of write access or the percentage of write access), which is monitored respectively for each of the multiple processes that access the first shared virtual memory page (the weighting value corresponding to each process may be set as required, and may surely be all 1s), may be used as the monitored access characteristics of access performed by the multiple processes for the first shared virtual memory page. In a scenario that the first process or the second process includes multiple processes, the monitored access characteristics of access performed by the first process or the second process for the first shared virtual memory page may be determined in the above exemplary manner. Other circumstances can be inferred similarly.

The following gives a brief description about working principles of the DSM mode and the SPM mode.

Based on the DSM mode, all processes of a concurrent program may have the same shared virtual address space. Each process maps part or all of the virtual memory pages in the shared virtual address space to a private physical memory space maintained by this process. On the user level, each process sees a complete shared virtual address space but cannot perceive that the shared data included in a virtual memory page in the shared virtual address space is actually a private physical memory space maintained by other processes.

Each process may perform any data operation for the shared virtual address space. A DSM bottom layer synchronizes data between all processes by using an on-chip network or a system shared physical memory accessible by all processes. Multiple processes of one concurrent program may run on a processor core, or each process runs on a separate processor core.

For example, as shown in FIG. 2-*a*, region a in FIG. 2-*a* is a shared virtual address space of programs; four processes P0~P3 run on different processor cores; they have a uniform shared virtual address space for storing shared data, where the first region in the virtual address space is mapped to the private physical memory space of P0, the second region is mapped to the private physical memory space of P1, the third region is mapped to the private physical memory space of P2, and the fourth region is mapped to the private physical memory space of P3.

For example, as shown in FIG. 2-*b*, a home region in FIG. 2-*b* is a private physical address space of each process, and each process maintains a non-overlapped physical memory space (the part indicated by "home" in FIG. 2-*b*) mapped from the shared virtual address space. If process 1 accesses variable z in the physical memory region maintained by process 2 in the shared virtual address space, the DSM protocol copies the physical memory page inclusive of variable z, which is maintained by process 2, to the physical memory of process 1 (see the part indicated by "cache" of P1 in FIG. 2-*b*). In this way, process 1 can access variable z. The DSM protocol maintains coherence of variable z in the system to ensure that process 1 and process 2 see the same variable z.

The DSM mode maps the virtual memory page in the shared virtual address space to the private physical memory space maintained by the process, and the private physical memory space data is generally configured as being cached by L1 Cache and L2 Cache. Therefore, when the CPU reads data, the cache hit rate (cache hits) is very high; and, when the CPU writes data, the cache hit rate is very high too, which is very favorable to program performance.

Based on the SPM mode, the shared virtual address space is mapped to the shared physical address space in all processes of the same concurrent program to achieve software cache coherence. The SPM mode generally disables L2 Cache, and L1 Cache is generally set to employ a write through (WT) policy. Generally, based on the SPM mode, a memory page generally maintains only one copy in the shared physical memory space, which saves the physical memory space.

Research and practice show that the DSM mode and the SPM mode have their respective advantages and disadvantages, and the DSM mode and the SPM mode have a certain preference for different access characteristics (for example, different access frequencies, different access modes). Therefore, in the solution in the embodiment of the present disclosure, the access characteristics of access performed by the process for the shared virtual memory page are monitored, and the monitored access characteristics are used as a basis for determining whether to reset the management mode of the shared virtual memory page. Such an adaptive mechanism between the access characteristics and the management mode is good for enhancing performance of accessing the shared virtual memory page and therefore good for improving performance of the corresponding program and the user experience.

As can be seen, in the embodiment of the present disclosure, the access characteristics of the shared virtual memory page are monitored; and the management mode of the shared virtual memory page is changed to an SPM mode if the monitored access characteristics meet the first set condition and the current management mode of the shared virtual memory page is a DSM mode, and/or, the management mode of the shared virtual memory page is changed to a DSM mode if the monitored access characteristics meet the second set condition and the current management mode of the shared virtual memory page is an SPM mode. The mechanism of resetting the management mode of the shared virtual memory page according to a monitoring result of the access characteristics achieves better matching between the management mode and the access characteristics, brings the advantages of the DSM mode or the SPM mode into better play, and lays a mechanism foundation for enhancing performance of accessing the shared virtual memory.

To better understand and implement the above solutions of the present disclosure, the following describes several application scenarios as examples.

Figure 3:
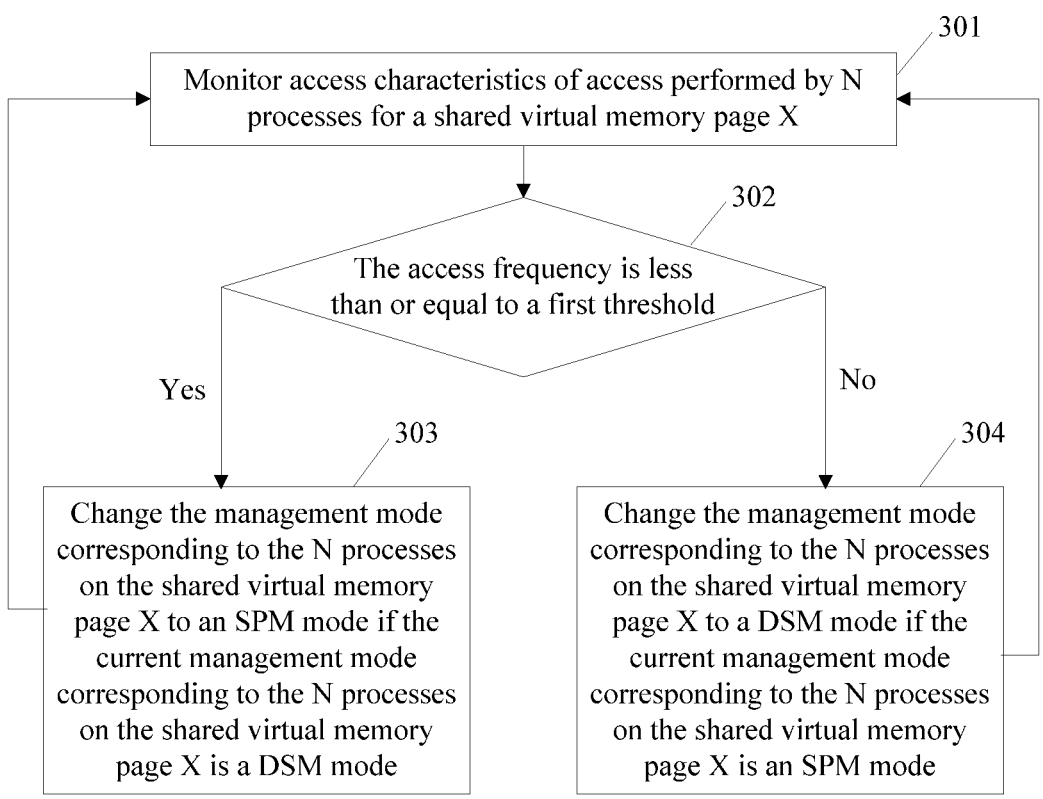
FIG. 3 is a schematic flowchart of another method for determining a management mode of a shared virtual memory page according to an embodiment of the present disclosure.

See FIG. 3. FIG. 3 is a schematic flowchart of another method for determining a management mode of a shared virtual memory page according to an embodiment of the present disclosure. As shown in FIG. 3, the other method for determining a management mode of a shared virtual memory page according to an embodiment of the present disclosure may include the following content:

Block 301 discloses monitoring access characteristics of access performed by N processes for the shared virtual memory page X.

N is a positive integer greater than 1. For example, the N processes may refer to part or all of the processes currently existent in the system. For example, the N processes may refer to part or all of the processes, which currently exist in the system and will possibly access the shared virtual memory page X.

It can be understood that the shared virtual memory page X in this embodiment may correspond to the first shared virtual memory page in the preceding embodiment.

In some embodiments of the present disclosure, various access characteristics of access performed by N processes for the shared virtual memory page X may be monitored, and an example given in this embodiment is to detect the access frequency of access performed by N processes for the shared virtual memory page X.

In some embodiments of the present disclosure, the access frequency of access performed by the N processes for the shared virtual memory page X may refer to the times the processes access the shared virtual memory page X in a unit time. In other embodiments of the present disclosure, the access frequency of access performed by the N processes for the shared virtual memory page X may refer to a percentage of the number of times of access performed by the N processes for the shared virtual memory page X to the total number of times of access performed by the N processes for N1 shared virtual memory pages in a duration (such as a unit time), where the N1 shared virtual memory pages include the shared virtual memory page X and N1 is a positive integer greater than 1. Of course, the way of calculating the access frequency of access performed by the N processes for the shared virtual memory page X is not limited to the above example, and other ways of calculation compliant with the laws of the nature may be defined as required.

Block 302 discloses judging whether the monitored access frequency of access performed by the N processes for the shared virtual memory page X is less than or equal to a first threshold, and if yes, perform the elements in Block 303 or, if no, perform step 304.

Block 303 discloses that if the monitored access frequency of access performed by the N processes for the shared virtual memory page X is less than or equal to the first threshold and the current management mode corresponding to the N processes on the shared virtual memory page X is a DSM mode, change the management mode corresponding to the N processes on the shared virtual memory page X to an SPM mode, and return to step 301; and, if the current management mode corresponding to the N processes on the shared virtual memory page X is an SPM mode, return to step 301.

Block 304 discloses that if the monitored access frequency of access performed by the N processes for the shared virtual memory page X is greater than a second threshold and the current management mode corresponding to the N processes on the shared virtual memory page X is an SPM mode, change the management mode corresponding to the N processes on the shared virtual memory page X to a DSM mode, and return to step 301; and, if the current management mode corresponding to the N processes on the shared virtual memory page X is a DSM mode, return to step 301.

In some embodiments of the present disclosure, for example, the first threshold may be 1000 times per second, 2000 times per second, 5000 times per second, or another frequency value; and the first threshold may be less than or equal to the second threshold, and the second threshold may be 1000 times per second, 2000 times per second, 3000 times per second, 5000 times per second, or another frequency value. In other embodiments of the present disclosure, for example, the first threshold may be 20%, 25%, 30%, 35% or another percentage, the first threshold may be less than or equal to the second threshold, and the second threshold may be 20%, 25%, 30%, 35% or another percentage. It can be understood that such a policy may be regarded as a consumptive selection policy according to access data.

It can be understood that in different multi-core or many-core systems, the management mode corresponding to the N processes on the shared virtual memory page X may be changed to a DSM mode in different ways.

In some embodiments of the present disclosure, the changing the management mode corresponding to the N processes on the shared virtual memory page X to a DSM mode may include: in a first physical memory space, allocating a first physical memory page to the first shared virtual memory page; copying data stored on a second physical memory page to the first physical memory page, where the second physical memory page belongs to a shared physical memory space, and the second physical memory page is a physical memory page currently mapped from the shared virtual memory page X; creating a mapping relationship between the shared virtual memory page X and the first physical memory page; and recording the DSM mode as the management mode corresponding to the N processes on the shared virtual memory page X. For example, the management mode of the shared virtual memory page X, which is recorded in the page information structure body of the N processes, may be all recorded as a DSM mode.

In some embodiments of the present disclosure, the changing the management mode corresponding to the N processes on the shared virtual memory page X to an SPM mode may include: creating a mapping relationship between the shared virtual memory page X and a third physical memory page, where the third physical memory page belongs to the shared physical memory space; and recording the SPM mode as the management mode corresponding to the N processes on the shared virtual memory page X. For example, the management mode of the shared virtual memory page X, which is recorded in the page information structure body of the N processes, may be all recorded as an SPM mode. Further, before creating a mapping relationship between the shared virtual memory page X and a third physical memory page, the method may further include: synchronizing changed data in the data stored on a fourth physical memory page previously mapped from the shared virtual memory page X to a third physical memory page. Of course, if the data stored on the fourth physical memory page previously mapped from the shared virtual memory page X remains unchanged, the data synchronization step may be omitted. The fourth physical memory page is a physical memory page previously mapped from the shared virtual memory page X.

The DSM mode and the SPM mode have a certain preference for different access frequencies. Therefore, in the solution in this embodiment, the access characteristics of access performed by the N processes for the shared virtual memory page are monitored, and the monitored access characteristics are used as a basis for determining whether to reset the management mode corresponding to the N processes on the shared virtual memory page. Such an adaptive mechanism between the access characteristics and the management mode is good for enhancing performance of accessing the shared virtual memory page and therefore good for improving performance of the corresponding program and the user experience.

Figure 4:
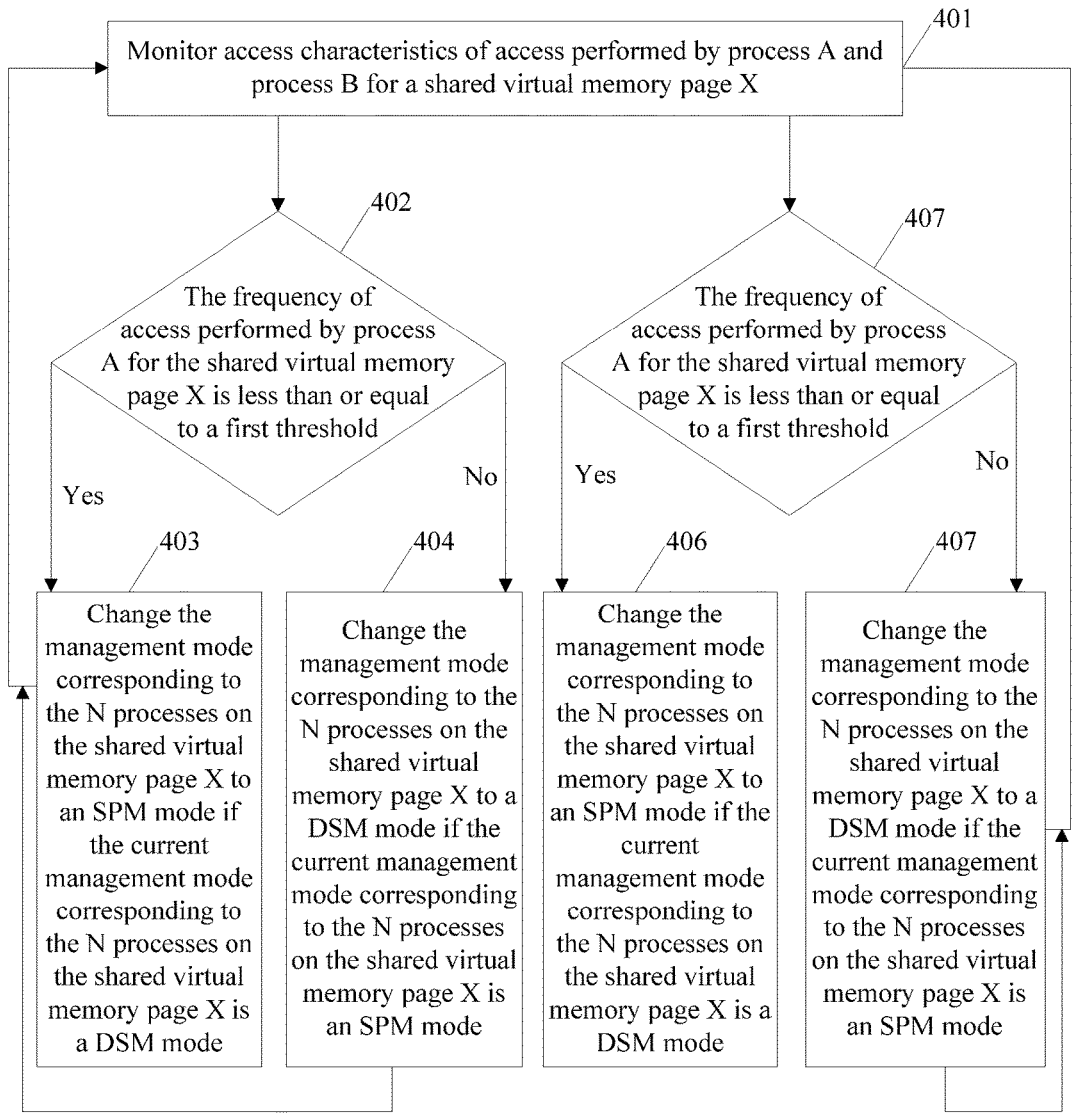
FIG. 4 is a schematic flowchart of another method for determining a management mode of a shared virtual memory page according to an embodiment of the present disclosure.

FIG. 4 is a schematic flowchart of another method for determining a management mode of a shared virtual memory page according to an embodiment of the present disclosure. The other method for determining a management mode of a shared virtual memory page according to an embodiment of the present disclosure may include the following content:

In Block 401 it is monitoring access characteristics of access performed by process A and process B for the shared virtual memory page X is shown.

In some embodiments of the present disclosure, various access characteristics of access performed by process A and process B for the shared virtual memory page X may be monitored, and an example given in this embodiment is to detect the access frequency of access performed by process A and process B for the shared virtual memory page X.

It can be understood that the shared virtual memory page X in this embodiment may correspond to the first shared virtual memory page in the preceding embodiment.

In some embodiments of the present disclosure, the frequency of access performed by process A and process B for the shared virtual memory page X may refer to the times process A and process B access the shared virtual memory page X in a unit time.

In other embodiments of the present disclosure, the frequency of access performed by process A and process B for the shared virtual memory page X may also refer to a percentage of the number of times of process A and process B accessing the shared virtual memory page X to the total number of times of process A and process B accessing N1 shared virtual memory pages in a duration (such as a unit time), where the N1 shared virtual memory pages include the shared virtual memory page X, and N1 is a positive integer greater than 1.

Of course, the way of calculating the frequency of access performed by process A and process B for the shared virtual memory page X is not limited to the above example, and other ways of calculation compliant with the laws of the nature may be defined as required.

In block 402, judging whether the monitored frequency of access performed by process A for the shared virtual memory page X is less than or equal to a first threshold is disclosed, If the result of block 402 is if yes, then the elements in block 403 are performed, and if the result of block 402 is no, then the elements in block 404 are performed.

Block 403 discloses that if the monitored frequency of access performed by process A for the shared virtual memory page X is less than or equal to the first threshold and the current management mode corresponding to process A on the shared virtual memory page X is a DSM mode, change the management mode corresponding to process A on the shared virtual memory page X to an SPM mode, and return to step 401; and, if the current management mode corresponding to process A on the shared virtual memory page X is an SPM mode, return to step 401.

Block 404 discloses that if the monitored frequency of access performed by process A for the shared virtual memory page X is greater than a second threshold and the current management mode corresponding to process A on the shared virtual memory page X is an SPM mode, change the management mode corresponding to process A on the shared virtual memory page X to a DSM mode, and return to step 401; and, if the current management mode corresponding to process A on the shared virtual memory page X is a DSM mode, return to step 401.

Block 405 discloses judging whether the monitored frequency of access performed by process B for the shared virtual memory page X is less than or equal to a first threshold.

Block 406 discloses that if the monitored frequency of access performed by process B for the shared virtual memory page X is less than or equal to the first threshold and the current management mode corresponding to process B on the shared virtual memory page X is a DSM mode, change the management mode corresponding to process B on the shared virtual memory page X to an SPM mode, and return to step 401; and, if the current management mode corresponding to process B on the shared virtual memory page X is an SPM mode, return to step 401.

Block 407 discloses that if the monitored frequency of access performed by process B for the shared virtual memory page X is greater than a second threshold and the current management mode corresponding to process B on the shared virtual memory page X is an SPM mode, change the management mode corresponding to process B on the shared virtual memory page X to a DSM mode, and return to step 401; and, if the current management mode corresponding to process B on the shared virtual memory page X is a DSM mode, return to step 401.

It can be understood that steps 402~404 and steps 405~407 do not necessarily occur in a definite order, and may be performed synchronously or consecutively.

In some embodiments of the present disclosure, for example, the first threshold may be 1000 times per second, 2000 times per second, 5000 times per second, or another frequency value; and the first threshold may be less than or equal to the second threshold, and the second threshold may be 1000 times per second, 2000 times per second, 3000 times per second, 5000 times per second, or another frequency value. In other embodiments of the present disclosure, for example, the first threshold may be 20%, 25%, 30%, 35% or another percentage, the first threshold may be less than or equal to the second threshold, and the second threshold may be 20%, 25%, 30%, 35% or another percentage.

It can be understood that such a policy may be regarded as a consumptive selection policy according to access data.

It can be understood that in different multi-core or many-core systems, the management mode corresponding to process A (or process B) of the shared virtual memory page X may be changed to a DSM mode in different ways.

In some embodiments of the present disclosure, the changing the management mode corresponding to process A (or process B) of the first shared virtual memory page to a DSM mode may include: in a first physical memory space, allocating a first physical memory page to the shared virtual memory page X; copying data stored on a second physical memory page to the first physical memory page, where the second physical memory page belongs to a shared physical memory space, and the second physical memory page is a physical memory page currently mapped from the shared virtual memory page X; creating a mapping relationship between the shared virtual memory page X and the first physical memory page; and recording the DSM mode as the management mode corresponding to process A (or process B) of the shared virtual memory page X. For example, the management mode of the shared virtual memory page X, which is recorded in the page information structure body of process A (or process B), may be all recorded as a DSM mode. In addition, in some embodiments of the present disclosure, the second physical memory page may remain effective subsequently, and the second physical memory page may serve as a synchronization channel between processes that use the DSM mode as a management mode of the shared virtual memory page X, or between processes that use the SPM mode as a management mode of the shared virtual memory page X, or between a process that uses the DSM mode as a management mode of the shared virtual memory page X and a process that uses the SPM mode as a management mode of the shared virtual memory page X, where the synchronization channel is specific to the shared virtual memory page X.

In some embodiments of the present disclosure, the changing the management mode corresponding to process A (or process B) of the shared virtual memory page X to an SPM mode may include: creating a mapping relationship between the shared virtual memory page X and a third physical memory page, where the third physical memory page belongs to the shared physical memory space; and recording the SPM mode as the management mode corresponding to process A (or process B) of the shared virtual memory page X. For example, the management mode of the shared virtual memory page X, which is recorded in the page information structure body of process A (or process B), may be all recorded as an SPM mode. Further, before creating a mapping relationship between the shared virtual memory page X and a third physical memory page, the method may further include: synchronizing changed data in the data stored on a fourth physical memory page previously mapped from the shared virtual memory page X to a third physical memory page.

Of course, if the data stored on the fourth physical memory page previously mapped from the shared virtual memory page X remains unchanged, the data synchronization step may be omitted.

The DSM mode and the SPM mode have a certain preference for different access frequencies. Therefore, in the solution in this embodiment, the access characteristics of access performed by process A and process B for the shared virtual memory page are monitored respectively, and the monitored access characteristics are used as a basis for determining respectively whether to reset the management mode corresponding to process A and process B on the shared virtual memory page. Such an adaptive mechanism between the access characteristics and the management mode is good for enhancing performance of accessing the shared virtual memory page and therefore good for improving performance of the corresponding program and the user experience. Moreover, the access characteristics of different processes serve as a basis for determining whether to reset the management mode corresponding to each process on the shared virtual memory page, which makes the management mode more adaptive and enhances access performance.

To enable better implementation of the above solution in the embodiment of the present disclosure, the following describes related apparatuses for implementing the above solution.

As shown in FIG. 5-a, an apparatus 500 for determining a management mode of a shared virtual memory page according to an embodiment of the present disclosure may include a monitoring unit 510 and a first remapping unit 520.

The monitoring unit 510 is configured to monitor access characteristics of access performed by a process for the shared virtual memory page.

The first remapping unit 520 connected to the monitoring unit 510 is configured to change the management mode of the shared virtual memory page to an SPM mode if the access characteristics monitored by the monitoring unit 510 meet a first set condition and a current management mode of the shared virtual memory page is a DSM mode.

As shown in FIG. 5-b, the apparatus 500 for determining a management mode of a shared virtual memory page may further include a second remapping unit 530 connected to the monitoring unit 510, configured to change the management mode of the shared virtual memory page to a DSM mode if the access characteristics monitored by the monitoring unit 510 meet a second set condition and a current management mode of the shared virtual memory page is an SPM mode.

As shown in FIG. 5-c, the apparatus 500 for determining a management mode of a shared virtual memory page may include a second remapping unit 530 connected to the monitoring unit 510, configured to change the management mode of the shared virtual memory page to a DSM mode if the access characteristics monitored by the monitoring unit 510 meet a second set condition and a current management mode of the shared virtual memory page is an SPM mode.

It can be understood that the first set condition and the second set condition may vary with the monitored access characteristics. For example, if the monitored access characteristics are an access frequency, the first set condition and the second set condition may include set conditions related to the access frequency; if the monitored access characteristics are an access mode, the first set condition and the second set condition may include set conditions related to the access mode; if the monitored access characteristics include the access frequency and the access mode, the first set condition and the second set condition may include set conditions related to the both access frequency and the access mode.

In some embodiments of the present disclosure, if the monitored access characteristics include an access frequency of access performed by the process for the first shared virtual memory page, the first set condition may include that the access frequency is less than or equal to a first threshold (for example, the first threshold may be 1000 times per second, 2000 times per second, 5000 times per second, or another frequency value); and the second set condition may include that the access frequency is greater than a second threshold, where the first threshold may be less than or equal to the second threshold, and the second threshold may be 1000 times per second, 2000 times per second, 3000 times per second, 5000 times per second, or another frequency value, where the second threshold is greater than or equal to the first threshold. In this scenario, the management mode of the first shared virtual memory page may be changed to an SPM mode if the monitored access frequency is less than or equal to the first threshold and the current management mode of the first shared virtual memory page is a DSM mode, and/or, the management mode of the first shared virtual memory page may be changed to a DSM mode if the monitored access frequency is greater than the second threshold and the current management mode of the first shared virtual memory page is an SPM mode. It can be understood that such a policy may be regarded as a consumptive selection policy according to access data.

In other embodiments of the present disclosure, if the monitored access characteristics include an access mode of access performed by the process for the shared virtual memory page, the first set condition may include that the access mode is write access or read-write access (or the percentage of the write access exceeds a fourth threshold or the frequency of the write access exceeds a third threshold); and the second set condition may include that the percentage of the read-only access or read access exceeds a sixth threshold or that the frequency of the read access exceeds a fifth threshold, where the sum of the fourth threshold and the sixth threshold may be greater than or equal to 1. In this scenario, the management mode of the first shared virtual memory page may be changed to an SPM mode if the monitored access mode is write access or read-write access (or the percentage of the write access exceeds a fourth threshold or the frequency of the write access exceeds a third threshold) and the current management mode of the first shared virtual memory page is a DSM mode; and/or, the management mode of the first shared virtual memory page may be changed to a DSM mode if the monitored access mode is read-only access (or the percentage of the read access exceeds the sixth threshold or the frequency of the read access exceeds the fifth threshold) and the current management mode of the first shared virtual memory page is an SPM mode, and other circumstances may be inferred similarly. It can be understood that such a policy may be regarded as a consumptive selection policy according to access synchronization.

In some embodiments of the present disclosure, the first set condition may include that the access frequency is less than or equal to a first threshold, or the access mode is read-write access or write access, or the frequency of the write access is greater than a third threshold, or the percentage of the write access is greater than a fourth threshold.

In some embodiments of the present disclosure, the monitoring unit 510 is specifically configured to monitor the access frequency of access performed by the process for the shared virtual memory page.

The first remapping unit 520 may be specifically configured to change the management mode of the shared virtual memory page to a shared physical memory mode if the access frequency monitored by the monitoring unit 510 is less than or equal to the first threshold and the current management mode of the shared virtual memory page is a distributed shared memory mode.

Alternatively, the monitoring unit 510 is specifically configured to monitor the access mode of access performed by the process for the shared virtual memory page; and the first remapping unit 520 may be specifically configured to change the management mode of the shared virtual memory page to a shared physical memory mode if the access mode monitored by the monitoring unit 510 is read-write access or write access and if the current management mode of the shared virtual memory page is a distributed shared memory mode.

Alternatively, the monitoring unit 510 is specifically configured to monitor the frequency of write access performed by the process for the shared virtual memory page; and the first remapping unit 520 may be specifically configured to change the management mode of the shared virtual memory page to a shared physical memory mode if the frequency of write access monitored by the monitoring unit 510 is greater than a third threshold and if the current management mode of the shared virtual memory page is a distributed shared memory mode.

Alternatively, the monitoring unit 510 is specifically configured to monitor the percentage of access performed by the process for the shared virtual memory page; and the first remapping unit 520 may be specifically configured to change the management mode of the shared virtual memory page to a shared physical memory mode if the percentage of write access monitored by the monitoring unit 510 is greater than a fourth threshold and if the current management mode of the shared virtual memory page is a distributed shared memory mode.

In some embodiments of the present disclosure, the second set condition includes that the access frequency is greater than a second threshold, the access mode is read-only access, the frequency of the read access is greater than a fifth threshold, or the percentage of the read access is greater than a sixth threshold, where the second threshold may be greater than or equal to the first threshold.

The monitoring unit 510 is specifically configured to monitor the frequency of access performed by the process for the shared virtual memory page; and the second remapping unit 530 may be specifically configured to change the management mode of the shared virtual memory page to a distributed shared memory mode if the frequency of access monitored by the monitoring unit 510 is greater than a second threshold and if the current management mode of the shared virtual memory page is a shared physical memory mode.

Alternatively, the monitoring unit 510 is specifically configured to monitor the mode of access performed by the process for the shared virtual memory page; and the second remapping unit 530 may be specifically configured to change the management mode of the shared virtual memory page to a distributed shared memory mode if the mode of access monitored by the monitoring unit 510 is read-only access and if the current management mode of the shared virtual memory page is a shared physical memory mode.

Alternatively, the monitoring unit 510 is specifically configured to monitor the frequency of read access performed by the process for the shared virtual memory page; and the second remapping unit 530 may be specifically configured to change the management mode of the shared virtual memory page to a distributed shared memory mode if the frequency of read access monitored by the monitoring unit 510 is greater than a fifth threshold and if the current management mode of the shared virtual memory page is a shared physical memory mode.

Alternatively, the monitoring unit 510 is specifically configured to monitor the percentage of read access performed by the process for the shared virtual memory page; and the second remapping unit 530 may be specifically configured to change the management mode of the shared virtual memory page to a distributed shared memory mode if the percentage of read access monitored by the monitoring unit 510 is greater than a sixth threshold and if the current management mode of the shared virtual memory page is a shared physical memory mode.

In some embodiments of the present disclosure, the first remapping unit 520 may be specifically configured to: if the access characteristics monitored by the monitoring unit 510 meet a first set condition and the current management mode of the shared virtual memory page is a DSM mode, create a mapping relationship between the shared virtual memory page and a third physical memory page, where the third physical memory page belongs to the shared physical memory space; and record the SPM mode as the management mode of the shared virtual memory page, where data stored on the physical memory page previously mapped from the shared virtual memory page remains unchanged.

In some embodiments of the present disclosure, the first remapping unit 520 may also be specifically configured to: synchronize changed data in data stored on a fourth physical memory page to a third physical memory page if the access characteristics monitored by the monitoring unit 510 meet a first set condition and the current management mode of the shared virtual memory page is a DSM mode; create a mapping relationship between the shared virtual memory page and the third physical memory page, where the third physical memory page belongs to the shared physical memory space; and record the SPM mode as the management mode of the shared virtual memory page, where the fourth physical memory page is a physical memory page previously mapped from the shared virtual memory page and the data stored on the physical memory page is changed.

In some embodiments of the present disclosure, the second remapping unit 530 may be specifically configured to: if the access characteristics monitored by the monitoring unit 510 meet a second set condition and the current management mode of the shared virtual memory page is an SPM mode, then in a first physical memory space, allocate a first physical memory page to the shared virtual memory page; copy data stored on a second physical memory page to the first physical memory page, where the second physical memory page belongs to a shared physical memory space, and the second physical memory page is a physical memory page currently mapped from the shared virtual memory page; create a mapping relationship between the shared virtual memory page and the first physical memory page; and record the DSM mode as the management mode of the shared virtual memory page.

In some embodiments of the present disclosure, the monitoring unit 510 is specifically configured to monitor the access characteristics of access performed by the first process for the shared virtual memory page, where the first process includes M1 processes and M1 is a positive integer.

The first remapping unit 520 may be specifically configured to change the management mode corresponding to the first process on the shared virtual memory page to an SPM mode if the access characteristics of access performed by the first process for the shared virtual memory page, which are monitored by the monitoring unit 510, meet the first set condition, and, if the current management mode corresponding to the first process on the shared virtual memory page is a DSM mode.

The second remapping unit 530 may be specifically configured to change the management mode corresponding to the first process on the shared virtual memory page to a DSM mode if the access characteristics of access performed by the first process for the shared virtual memory page, which are monitored by the monitoring unit 510, meet the second set condition, and, if the current management mode corresponding to the first process on the shared virtual memory page is an SPM mode.

In some embodiments of the present disclosure, if M1 is greater than 1, the monitored access characteristics of access performed by one of the M1 processes for the shared virtual memory page may be used as the monitored access characteristics of access performed by the first process for the shared virtual memory page. Alternatively, the monitored integrated access characteristics of access performed by the M1 processes for the first shared virtual memory page may be used as the monitored access characteristics of access performed by the first process for the shared virtual memory page. For example, an average, a weighted average, a sum, or a weighted sum of the access characteristics, which are monitored respectively for each of the M1 processes that access the shared virtual memory page, may be used as the monitored access characteristics of access performed by the first process for the shared virtual memory page.

In some embodiments of the present disclosure, the monitoring unit 510 is further configured to monitor the access characteristics of access performed by the second process for the shared virtual memory page, where the second process includes M2 processes, M2 is a positive integer, and the second process is different from the first process.

The first remapping unit 520 may be further configured to change the management mode corresponding to the second process on the shared virtual memory page to an SPM mode if the access characteristics of access performed by the second process for the shared virtual memory page, which are monitored by the monitoring unit 510, meet the first set condition, and, if the current management mode corresponding to the second process on the shared virtual memory page is a DSM mode.

The second remapping unit 530 is configured to change the management mode corresponding to the second process on the shared virtual memory page to a DSM mode if the access characteristics of access performed by the second process for the shared virtual memory page, which are monitored by the monitoring unit 510, meet the second set condition, and, if the current management mode corresponding to the second process on the shared virtual memory page is an SPM mode.

In some embodiments of the present disclosure, if M2 is greater than 1, the monitored access characteristics of access performed by one of the M2 processes for the shared virtual memory page may be used as the monitored access characteristics of access performed by the second process for the shared virtual memory page. Alternatively, the monitored integrated access characteristics of access performed by the M2 processes for the first shared virtual memory page may be used as the monitored access characteristics of access performed by the second process for the shared virtual memory page. For example, an average, a weighted average, a sum, or a weighted sum of the access characteristics, which are monitored respectively for each of the M2 processes that access the shared virtual memory page, may be used as the monitored access characteristics of access performed by the second process for the shared virtual memory page.

For example, if the first process (or the second process) includes multiple processes, the first remapping unit 520 may be specifically configured to: use an average, a weighted average, a sum, or a weighted sum of access characteristics, which are respectively monitored by the monitoring unit 510 for each process in the first process (or the second process) that accesses the shared virtual memory page, as the monitored access characteristics of the first process (or the second process) that accesses the shared virtual memory page; or, use the access characteristics, which are monitored by the monitoring unit 510 for one process in the first process (or the second process) that accesses the shared virtual memory page, as the monitored access characteristics of the first process (or the second process) that accesses the shared virtual memory page; and change the management mode corresponding to the first process (or the second process) on the shared virtual memory page to a shared physical memory mode if the monitored access characteristics of access performed by the processes for the shared virtual memory page meet the first condition and if the current management mode corresponding to the first process (or the second process) on the shared virtual memory page is a distributed shared memory mode.

In another example, if the first process (or the second process) includes multiple processes, the second remapping unit 530 may be specifically configured to: use an average, a weighted average, a sum, or a weighted sum of access characteristics, which are respectively monitored by the monitoring unit 510 for each process in the first process (or the second process) that accesses the shared virtual memory page, as the monitored access characteristics of the first process (or the second process) that accesses the shared virtual memory page; or, use the access characteristics, which are monitored by the monitoring unit 510 for one process in the first process (or the second process) that accesses the shared virtual memory page, as the monitored access characteristics of the first process (or the second process) that accesses the shared virtual memory page; and change the management mode corresponding to the first process (or the second process) on the shared virtual memory page to a distributed shared memory mode if the monitored access characteristics of access performed by the processes for the shared virtual memory page meet the second condition and if the current management mode corresponding to the first process (or the second process) on the shared virtual memory page is a shared physical memory mode.

It can be understood that the apparatus 500 for determining a management mode of a shared virtual memory page may be deployed on a communication device such as an access network device or a core network device or a router or another communication device, and the apparatus 500 for determining a management mode of a shared virtual memory page may also be deployed on a server or a personal computer or another computer device.

It can be understood that functions of function modules in the apparatus 500 for determining a management mode of a shared virtual memory page in this embodiment may be implemented according to the method described in the method embodiment. For detailed implementation processes of the apparatus, reference may be made to related descriptions in the method embodiment, and no repeated description is given here any further.

As can be seen, the apparatus 500 for determining a management mode of a shared virtual memory page in this embodiment monitors the access characteristics of the shared virtual memory page; and changes the management mode of the shared virtual memory page to a shared physical memory mode if the monitored access characteristics meet the first set condition and the current management mode of the shared virtual memory page is a distributed shared memory mode, or, changes the management mode of the shared virtual memory page to a distributed shared memory mode if the monitored access characteristics meet the second set condition and the current management mode of the shared virtual memory page is a shared physical memory mode. The mechanism of resetting the management mode of the shared virtual memory page according to a monitoring result of the access characteristics achieves better matching between the management mode and the access characteristics, brings the advantages of the DSM mode or the SPM mode into better play, and lays a mechanism foundation for enhancing performance of accessing the shared virtual memory.

FIG. 6 is a schematic structural diagram of a computer system according to the present disclosure. As shown in FIG. 6, the computer system in this embodiment includes at least one bus 601, at least one processor 602 connected to the bus 601, and at least one memory 603 connected to the bus 601.

The processor 602 uses the bus 601 to call codes in the memory 603 to: monitor the access characteristics of the shared virtual memory page; and change the management mode of the shared virtual memory page to an SPM mode if the monitored access characteristics meet the first set condition and the current management mode of the shared virtual memory page is a DSM mode, and/or, change the management mode of the shared virtual memory page to a DSM mode if the monitored access characteristics meet the second set condition and the current management mode of the shared virtual memory page is an SPM mode.

In some embodiments of the present disclosure, for example, the processor 602 can monitor the access characteristics of access performed by N processes for the shared virtual memory page (for convenience of citation, called a first shared virtual memory page below), where N is a positive integer. For example, if N is equal to 1, the N process may refer to any process currently existent in the system or a specific process; if N is greater than 1, the N processes may refer to part or all of the processes currently existent in the system. For example, the N processes may refer to part or all of the processes, which currently exist in the system and will possibly access the first shared virtual memory page. In some embodiments of the present disclosure, for example, a performance counter or other hardware or programs may be used to monitor the access characteristics of the shared virtual memory page.

In some embodiments of the present disclosure, for example, the processor 602 can monitor various access characteristics of access performed by the process for the shared virtual memory page. The access characteristics may include access frequency and/or access mode, and so on. The access modes may include read-only access, read-write access, write access, and so on. That is, the processor 602 can monitor the access characteristics such as access frequency and/or access mode of access performed by the process for the shared virtual memory page.

It can be understood that the first set condition and the second set condition may vary with the monitored access characteristics. For example, if the monitored access characteristics are an access frequency, the first set condition and the second set condition may include set conditions related to the access frequency; if the monitored access characteristics are an access mode, the first set condition and the second set condition may include set conditions related to the access mode; if the monitored access characteristics include the access frequency and the access mode, the first set condition and the second set condition may include set conditions related to the both access frequency and the access mode.

In some embodiments of the present disclosure, if the monitored access characteristics include an access frequency of access performed by the process for the first shared virtual memory page, the first set condition may include that the access frequency is less than or equal to a first threshold (for example, the first threshold may be 1000 times per second, 2000 times per second, 5000 times per second, or another frequency value); and the second set condition may include that the access frequency is greater than a second threshold, where the first threshold may be less than or equal to the second threshold, and the second threshold may be 1000 times per second, 2000 times per second, 3000 times per second, 5000 times per second, or another frequency value, In this scenario, the management mode of the first shared virtual memory page may be changed to an SPM mode if the monitored access frequency is less than or equal to the first threshold and the current management mode of the first shared virtual memory page is a DSM mode, and/or, the management mode of the first shared virtual memory page may be changed to a DSM mode if the monitored access frequency is greater than the second threshold and the current management mode of the first shared virtual memory page is an SPM mode. It can be understood that such a policy may be regarded as a consumptive selection policy according to access data.

In other embodiments of the present disclosure, if the monitored access characteristics include an access mode of access performed by the process for the shared virtual memory page, the first set condition may include that the access mode is write access or read-write access (or the percentage of the write access exceeds a fourth threshold or the frequency of the write access exceeds a third threshold); and the second set condition may include that the percentage of the read-only access or read access exceeds a sixth threshold or that the frequency of the read access exceeds a fifth threshold, where the sum of the fourth threshold and the sixth threshold may be greater than or equal to 1. In this scenario, if the processor 602 may change the management mode of the first shared virtual memory page to an SPM mode if the access mode monitored by the processor 602 is write access or read-write access (or the percentage of the write access exceeds a fourth threshold or the frequency of the write access exceeds a third threshold) and the current management mode of the first shared virtual memory page is a DSM mode; and/or, the processor 602 may change the management mode of the first shared virtual memory page to a DSM mode if the access mode monitored by the processor 602 is read-only access (or the percentage of the read access exceeds the sixth threshold or the frequency of the read access exceeds the fifth threshold) and the current management mode of the first shared virtual memory page is an SPM mode, and other circumstances may be inferred similarly.

In some embodiments of the present disclosure, the changing, by the processor 602, the management mode of the first shared virtual memory page to a DSM mode, may include: in a first physical memory space, allocating a first physical memory page to the first shared virtual memory page; copying data stored on a second physical memory page to the first physical memory page, where the second physical memory page belongs to a shared physical memory space (the shared physical memory space is a physical memory space that can be shared by several cores), and the second physical memory page is a physical memory page currently mapped from the first shared virtual memory page; creating a mapping relationship between the first shared virtual memory page and the first physical memory page; and recording the DSM mode as the management mode of the first shared virtual memory page.

In some embodiments of the present disclosure, the changing, by the processor 602, the management mode of the shared virtual memory page to an SPM mode, may include: creating a mapping relationship between the first shared virtual memory page and the third physical memory page, where the third physical memory page belongs to the shared physical memory space (the shared physical memory space is a physical memory space that can be shared by several cores); and recording the SPM mode as the management mode of the first shared virtual memory page, where the data stored on the physical memory page previously mapped from the shared virtual memory page remains unchanged.

In some embodiments of the present disclosure, the changing, by the processor 602, the management mode of the shared virtual memory page to an SPM mode, may include: synchronizing, by the processor 602, changed data in the data stored on a fourth physical memory page to a third physical memory page; creating a mapping relationship between the first shared virtual memory page and the third physical memory page, where the third physical memory page belongs to the shared physical memory space (the shared physical memory space is a physical memory space that can be shared by several cores); and recording the SPM mode as the management mode of the first shared virtual memory page, where the fourth physical memory page is a physical memory page previously mapped from the shared virtual memory page and the data stored on the physical memory page is changed.

The processor 602 may record the DSM mode/SPM mode as the management mode of the first shared virtual memory page in a variety of ways. For example, a management mode flag bit is set for the first shared virtual memory page, and the management mode flag bit may be set to different values to identify whether the management mode of the first shared virtual memory page is a DSM mode or an SPM mode. Alternatively, the processor 602 may record the management mode of the first shared virtual memory page, which is recorded in the page information structure body of a process (or multiple processes or all processes), as a DSM mode or an SPM mode. Other ways of recording are not enumerated here exhaustively.

In some embodiments of the present disclosure, the processor 602 may set the management mode (such as DSM mode or SPM mode) for each shared virtual memory page (such as the first shared virtual memory page). In this scenario, for all the processes that access the first shared virtual memory page, the management mode of the first shared virtual memory page is the same. Of course, the management mode (such as DSM mode or SPM mode) corresponding to each process may also be set for each shared virtual memory page (such as the first shared virtual memory page). In this scenario, for all the processes that access the first shared virtual memory page, the management mode of the first shared virtual memory page is the same or different. For example, assuming that process A and process B exist, the management mode corresponding to process A on the first shared virtual memory page may be a DSM mode, and the management mode corresponding to process B on the first shared virtual memory page may be an SPM mode.

In some embodiments of the present disclosure, the processor 602 may monitor access characteristics of access performed by the first process for the first shared virtual memory page, where the first process includes M1 processes and M1 is a positive integer; and the processor 602 changes the management mode corresponding to the first process on the first shared virtual memory page to an SPM mode if the monitored access characteristics meet the first set condition and the current management mode corresponding to the first process on the first shared virtual memory page is a DSM mode; and/or, the processor 602 may change the management mode corresponding to the first process on the first shared virtual memory page to a DSM mode if the monitored access characteristics meet the second set condition and the current management mode corresponding to the first process on the first shared virtual memory page is an SPM mode.

In some embodiments of the present disclosure, the processor 602 may further monitor the access characteristics of access performed by the second process for the first shared virtual memory page, where the second process includes M2 processes, M2 is a positive integer, and the second process is different from the first process; the processor 602 may change the management mode corresponding to the second process on the first shared virtual memory page to an SPM mode if the monitored access characteristics of access performed by the second process for the first shared virtual memory page meet the third set condition and the current management mode corresponding to the second process on the first shared virtual memory page is a DSM mode; and/or, the processor 602 may change the management mode corresponding to the second process on the first shared virtual memory page to a DSM mode if the monitored access characteristics of access performed by the second process for the first shared virtual memory page meet the fourth set condition and the current management mode corresponding to the second process on the first shared virtual memory page is an SPM mode, where the third set condition is the same as or different from the first condition, and the fourth set condition is the same as or different from the second condition.

For example, if the first process (or the second process) includes multiple processes, the processor 602 may use an average, a weighted average, a sum, or a weighted sum of access characteristics, which are respectively monitored for each process in the first process (or the second process) that accesses the shared virtual memory page, as the monitored access characteristics of the first process (or the second process) that accesses the shared virtual memory page; or, use the access characteristics, which are monitored for one process in the first process (or the second process) that accesses the shared virtual memory page, as the monitored access characteristics of the first process (or the second process) that accesses the shared virtual memory page; and change the management mode corresponding to the first process (or the second process) on the shared virtual memory page to a shared physical memory mode if the monitored access characteristics of access performed by the processes for the shared virtual memory page meet the first condition and if the current management mode corresponding to the first process (or the second process) on the shared virtual memory page is a distributed shared memory mode.

In another example, if the first process (or the second process) includes multiple processes, the processor 602 may use an average, a weighted average, a sum, or a weighted sum of access characteristics, which are respectively monitored for each process in the first process (or the second process) that accesses the shared virtual memory page, as the monitored access characteristics of the first process (or the second process) that accesses the shared virtual memory page; or, use the access characteristics, which are monitored for one process in the first process (or the second process) that accesses the shared virtual memory page, as the monitored access characteristics of the first process (or the second process) that accesses the shared virtual memory page; and change the management mode corresponding to the first process (or the second process) on the shared virtual memory page to a distributed shared memory mode if the monitored access characteristics of access performed by the processes for the shared virtual memory page meet the second condition and if the current management mode corresponding to the first process (or the second process) on the shared virtual memory page is a shared physical memory mode.

Figure 7:
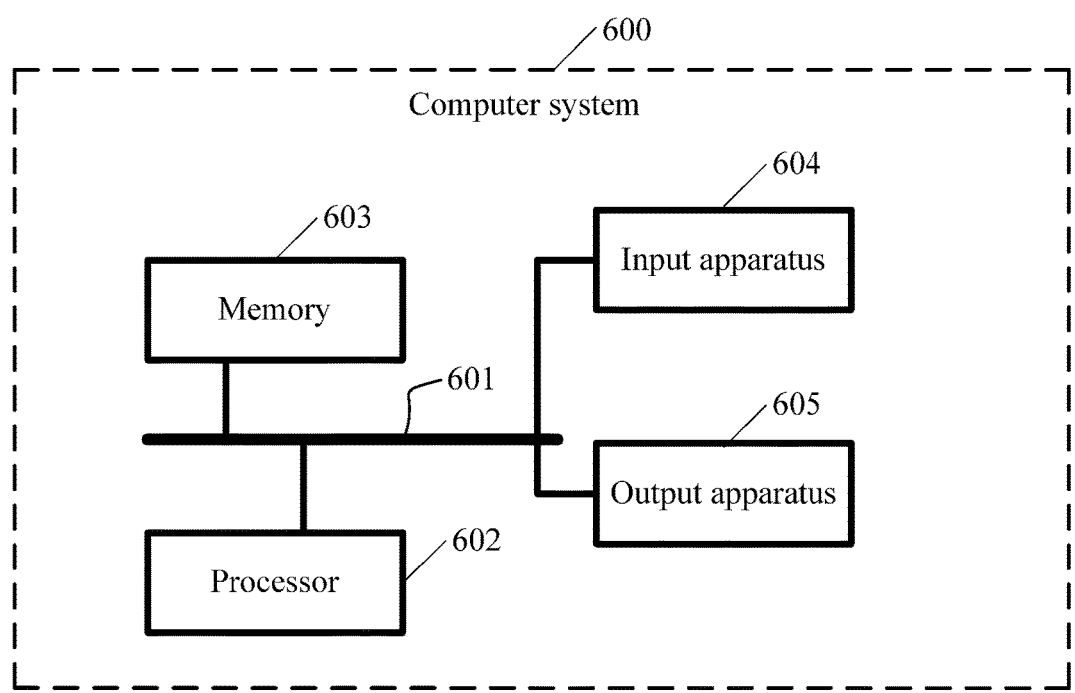
FIG. 7 is a schematic diagram of another computer system according to an embodiment of the present disclosure.

See FIG. FIG. 7 is a schematic diagram of another computer system 600 according to an embodiment of the present disclosure. The computer system 600 further includes an input apparatus 604 and an output apparatus 605, where the input apparatus 604 and the output apparatus 605 are connected to a bus 601.

The computer system provided in this embodiment can be used to implement the part corresponding to the computer system in the technical solutions of any method embodiment in FIG. 1 to FIG. 4; the implementation principles and technical effects are similar, and are not repeated here any further. FIG. 6 or FIG. 7 is only a schematic structural diagram of a computer system provided in the present disclosure, and the specific structure may be adjusted according to actual conditions.

It can be understood that the computer system 600 in this embodiment may be a communication device such as an access network device or a core network device or a router or another communication device, and the computer system 600 may be a server or a personal computer or another computer device.

It can be understood that the functions of components in the computer system 600 in this embodiment can be implemented according to the method described in the method embodiment. For the detailed implementation process, reference may be made to the related description in the method embodiment, and no repeated description is given here any further.

An embodiment of the present disclosure further provides a computer storage medium. The computer storage medium may store programs. When the programs run, the programs can execute part or all of the steps of the method for determining a management mode of a shared virtual memory page as described in the method embodiment.

It should be noted that for brevity, the above method embodiments are described as a series of actions. But those skilled in the art should appreciate that the present disclosure is not limited to the order of the described actions, because according to the present disclosure, some steps may adopt other order or occur simultaneously. It should also be understood by persons skilled in the art that all the described embodiments are preferred embodiments, and the involved actions and modules are not necessarily required by the present disclosure.

In the above embodiments, the description of each embodiment has its emphasis, and some embodiments may not be detailed. Reference may be made to the related description of other embodiments.

In the several embodiments provided in the present application, it should be understood that the disclosed apparatus may be implemented in other manners. For example, the described apparatus embodiment is merely exemplary. For example, the unit division is merely logical function division and there may be other division in actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may also be distributed on a plurality of network units. Some or all of the units may be selected to achieve the objective of the solution of the embodiment according to an actual need.

In addition, functional units in the embodiments of the present disclosure may be integrated into one processing unit, or each of the units may also exist alone physically, or two or more units may also be integrated into one unit. The integrated units may be implemented in a form of hardware, or may also be implemented in a form of a software functional unit.

When the integrated units are implemented in a form of a software functional unit and sold or used as an independent product, the integrated units may be stored in a computer-readable storage medium. Based on such an understanding, the technical solutions of the present disclosure essentially, a part contributing to the prior art, or all or a part of the technical solutions may be presented in a form of a software product. The computer software product is stored in a storage medium and includes several instructions for enabling a computer device (which may be a personal computer, a server, a network device, or the like) to perform all or a part of the steps of the methods described in the embodiments of the present disclosure. The foregoing storage medium includes: any medium that can store program codes, such as a USB flash disk, a read-only memory (ROM), a random access memory (RAM), a removable hard disk, a magnetic disk, or an optical disk.

The foregoing embodiments are merely provided for describing the technical solutions of the present disclosure other than limiting the present disclosure. Although the present disclosure is described in detail with reference to the foregoing embodiments, a person of ordinary skill in the art should understand that he may still make modifications to the technical solutions described in the foregoing embodiments, or make equivalent replacements to some technical features thereof, without departing from the scope of the technical solutions of the embodiments of the present disclosure.

What is claimed is:

1. A method for determining a management mode of a shared virtual memory page shared by at least one process running on a computer, comprising:
   monitoring the at least one process; and
   changing the management mode of the shared virtual memory page to a shared physical memory mode when a first condition is met by the process, wherein the first condition comprises at least one of an access frequency, an access mode, a frequency of write access, or a percentage of write access.

2. The method of claim 1, further comprising:
   changing the management mode of the shared virtual memory page to a distributed shared memory mode from a shared physical memory mode when a monitored frequency meets a second condition.

3. The method of claim 2, wherein the second condition comprises least one of the access frequency exceeds an access frequency threshold, a frequency of read access exceeds a read access threshold, or a percentage of read access is exceeds a percentage read access threshold.

4. The method of claim 3, wherein the changing the management mode of the shared virtual memory page to a distributed shared memory mode comprises:
allocating a first physical memory page to the shared virtual memory page in a first physical memory space;
copying data stored on a second physical memory page to the first physical memory page, wherein the second physical memory page belongs to a shared physical memory space, and the second physical memory page is a physical memory page currently mapped from the shared virtual memory page;
creating a mapping relationship between the shared virtual memory page and the first physical memory page; and
recording the distributed shared memory mode as the management mode of the shared virtual memory page.

5. The method of claim 1, wherein:
the changing the management mode of the shared virtual memory page to a shared physical memory mode comprises:
creating a mapping relationship between the shared virtual memory page and a first physical memory page, wherein the second physical memory page belongs to the shared physical memory space; and recording the shared physical memory mode as the management mode of the shared virtual memory page, wherein data stored on the first physical memory page previously mapped from the shared virtual memory page remains unchanged.

6. The method of claim 1, wherein:
the changing the management mode of the shared virtual memory page to a shared physical memory mode comprises:
synchronizing changed data stored on a first physical memory page to a second physical memory page; creating a mapping relationship between the shared virtual memory page and the first physical memory page, wherein the first physical memory page belongs to the shared physical memory space; and recording the shared physical memory mode as the management mode of the shared virtual memory page, wherein the second physical memory page is a physical memory page previously mapped from the shared virtual memory page.

7. The method of claim 1, further comprising:
changing the management mode of the shared virtual memory page to a distributed shared memory mode from a shared physical memory mode when a mode of access operation meets a second condition.

8. The method of claim 7, wherein the second condition comprises the access mode is read-only access.

9. The method of claim 8, wherein the changing the management mode of the shared virtual memory page to a distributed shared memory mode comprises:
allocating a first physical memory page to the shared virtual memory page in a first physical memory space;
copying data stored on a second physical memory page to the first physical memory page, wherein the second physical memory page belongs to a shared physical memory space, and the second physical memory page is a physical memory page currently mapped from the shared virtual memory page;
creating a mapping relationship between the shared virtual memory page and the first physical memory page; and
recording the distributed shared memory mode as the management mode of the shared virtual memory page.

10. An apparatus for determining a management mode of a shared virtual memory page, wherein the shared virtual memory page is shared by at least one process running on the apparatus, comprising:
a monitoring unit configured to monitor frequency or mode of access operation performed by the process to access the shared virtual memory page; and
a first remapping unit connected to the monitoring unit configured to change the management mode of the shared virtual memory page to a shared physical memory mode when the frequency or mode of access operation monitored by the monitoring unit meets a first set condition, wherein the current management mode of the shared virtual memory page is a distributed shared memory mode and the first set condition comprises at least one of an access frequency threshold, an access mode, a frequency of write access threshold, or a percentage of write access threshold.

11. The apparatus according to claim 10, further comprising:
a second remapping unit connected to the monitoring unit configured to change the management mode of the shared virtual memory page to a distributed shared memory mode when the frequency or mode of access operation monitored by the monitoring unit meets a second set condition.

12. The apparatus of claim 11, wherein the second set condition comprises at least one of a second read-only access mode, a second frequency of read access threshold, or a second percentage of read access threshold.

* * * * *